(12) United States Patent
Ramakrishnan et al.

(10) Patent No.: US 11,972,356 B2
(45) Date of Patent: Apr. 30, 2024

(54) SYSTEM AND/OR METHOD FOR AN AUTONOMOUS LINKED MANAGED SEMANTIC MODEL BASED KNOWLEDGE GRAPH GENERATION FRAMEWORK

(71) Applicant: App Orchid Inc., San Ramon, CA (US)

(72) Inventors: Krishnakumar Ramakrishnan, San Ramon, CA (US); Shilpashree Balakrishnan, Santa Clara, CA (US); Venkata Jagadeesh Kumar Macherla, Dublin, CA (US)

(73) Assignee: App Orchid Inc., San Ramon, CA (US)

( * ) Notice: Subject to any disclaimer, the term of this patent is extended or adjusted under 35 U.S.C. 154(b) by 236 days.

(21) Appl. No.: 17/073,061

(22) Filed: Oct. 16, 2020

(65) Prior Publication Data

US 2022/0121964 A1 Apr. 21, 2022

(51) Int. Cl.
| | | |
|---|---|---|
| *G06F 17/00* | (2019.01) | |
| *G06F 3/04842* | (2022.01) | |
| *G06F 40/169* | (2020.01) | |
| *G06F 40/237* | (2020.01) | |
| *G06F 40/30* | (2020.01) | |
| *G06N 5/022* | (2023.01) | |
| *G06N 5/04* | (2023.01) | |

(52) U.S. Cl.
CPC ......... *G06N 5/022* (2013.01); *G06F 3/04842* (2013.01); *G06F 40/169* (2020.01); *G06F 40/237* (2020.01); *G06F 40/30* (2020.01); *G06N 5/04* (2013.01)

(58) Field of Classification Search
CPC .. G06F 3/04842; G06F 40/169; G06F 40/237; G06F 40/30; G06N 5/022; G06N 5/04
USPC .................................................. 715/230, 234
See application file for complete search history.

(56) References Cited

U.S. PATENT DOCUMENTS

| | | | |
|---|---|---|---|
| 9,020,967 B2* | 4/2015 | Spivack ................ | G06N 5/048 |
| | | | 707/777 |
| 9,870,431 B2* | 1/2018 | Hammen .......... | G06F 17/30958 |
| 10,917,283 B2* | 2/2021 | Radivojevic ........ | H04L 41/0213 |
| 11,269,929 B2* | 3/2022 | Spangler ................ | G16B 50/10 |
| 11,410,052 B2* | 8/2022 | TeNyenhuis ............ | G06F 18/21 |
| 11,481,603 B1* | 10/2022 | Newman .............. | G06Q 40/025 |
| 11,810,001 B1* | 11/2023 | Tang .................... | G06F 16/9032 |
| 2006/0168154 A1* | 7/2006 | Zhang ................ | H04L 67/1097 |
| | | | 707/E17.005 |
| 2006/0271304 A1* | 11/2006 | He ...................... | G06F 16/9027 |
| | | | 707/999.102 |
| 2007/0033221 A1* | 2/2007 | Copperman ............ | G06F 16/36 |

(Continued)

OTHER PUBLICATIONS

Zhao, Complex Factoid Question Ansering with a Free-Text Knowledge Graph, International World Wide Web Conference Committee, published Apr. 20-24, 2020 (Year: 2020).*

(Continued)

*Primary Examiner* — Stephen S Hong
*Assistant Examiner* — Matthew J Ludwig
(74) *Attorney, Agent, or Firm* — Berkeley Law & Technology Group, LLP

(57) ABSTRACT

Briefly, embodiments, such as methods and/or systems for creating and/or updating elements of a knowledge graph (KG), for example, are described.

21 Claims, 21 Drawing Sheets

(56) References Cited

U.S. PATENT DOCUMENTS

| | | | | |
|---|---|---|---|---|
| 2010/0228693 | A1* | 9/2010 | Dawson | G06N 5/022 707/769 |
| 2013/0254193 | A1* | 9/2013 | Heidasch | G06F 16/9024 707/736 |
| 2014/0108304 | A1* | 4/2014 | Heidasch | G06F 40/30 706/12 |
| 2014/0108313 | A1* | 4/2014 | Heidasch | G06F 40/30 706/20 |
| 2014/0351261 | A1 | 11/2014 | Aswani et al. | |
| 2016/0299884 | A1* | 10/2016 | Chioasca | G06F 40/30 |
| 2016/0314158 | A1* | 10/2016 | Kelly | G06F 16/217 |
| 2018/0075359 | A1* | 3/2018 | Brennan | G06N 5/022 |
| 2019/0042988 | A1* | 2/2019 | Brown | G06F 9/547 |
| 2020/0005932 | A1* | 1/2020 | Butz-Ostendorf | G16B 50/10 |
| 2020/0012733 | A1* | 1/2020 | Ding | G06F 16/2264 |
| 2020/0320130 | A1* | 10/2020 | Korpman | G06F 16/8373 |
| 2020/0356732 | A1* | 11/2020 | Salmon | G06F 40/30 |
| 2020/0356951 | A1* | 11/2020 | Cristache | G06Q 10/10 |
| 2021/0056263 | A1* | 2/2021 | Xia | G06F 40/268 |
| 2021/0279303 | A1* | 9/2021 | Jang | G06F 21/577 |
| 2021/0279599 | A1* | 9/2021 | Carbune | G06F 16/9024 |
| 2021/0294781 | A1* | 9/2021 | Fernández Musoles | G10L 15/16 |
| 2021/0358601 | A1* | 11/2021 | Pillai | G16H 50/70 |
| 2022/0035988 | A1* | 2/2022 | Mason | G06F 40/186 |
| 2022/0067030 | A1* | 3/2022 | Jiao | G06N 3/084 |
| 2022/0398432 | A1* | 12/2022 | Porter | G06N 5/022 |

OTHER PUBLICATIONS

Deus, What can a knowledge graph do for oncology, Linkedin, published Jan. 21, 2019 (Year: 2019).*

Wu, "Fonduer: Knowledge Base Construction from Richly Formatted Data," SIGMOD'18, Jun. 10-15, 2018, Houston, TX, USA, 16 Pages.

Wu, et al., "Fonduer: Knowledge Base Construction from Richly Formatted Data," https://www.ncbi.nlm.nih.gov/pmc/articles/PMC6013301/, Mar. 2018, 16 Pages.

Yao, et al., "KG-BERT: BERT for Knowledge Graph Completion," https://www.semanticscholar.org/paper/KG-BERT%3A-BERT-for-Knowledge-Graph-Completion-Yao-Mao/31184789ef4c3084af930b1e0dede3215b4a9240, Sep. 2019, 8 Pages.

Dettmers, et al, "Convolutional 2D Knowledge Graph Embeddings," Association for the Advancement of Artificial Intelligence (www.aaai.org), 2018, 8 Pages.

Wang, et al, "Knowledge Graph Embedding: A Survey of Approaches and Applications," DOI 10.1109/TKDE.2017.2754499, IEEE Transactions on Knowledge and Data Engineering, 2017, 20 Pages.

Toutanova, et al., "Representing Text for Joint Embedding of Text and Knowledge Bases," https://www.researchgate.net/publication/281465729_Representing_Text_for_Joint_Embedding_of_Text_and_Knowledge_Bases, Sep. 2015, 11 Pages.

Zeng, et al, "Distant Supervision for Relation Extraction via Piecewise Convolutional Neural Networks," Proceedings of the 2015 Conference on Empirical Methods in Natural Language Processing, pp. 1753-1762, Lisbon, Portugal, Sep. 17-21, 2015, 10 Pages.

Vassiliadis, et al, "Modeling ETL Activities as Graphs," https://www.researchgate.net/publication/220841971_Modeling_ETL_activities_as_graphs, May 27, 2002, 32 Pages.

Xie, et al, "Representation Learning of Knowledge Graphs with Hierarchical Types," https://dl.acm.org/doi/10.5555/3060832.3061036, Jul. 2016, 7 Pages.

\* cited by examiner

```
□ {} JSON
    ■ @class : "com.appOrchid.core.mso.GroupMSO"
    ■ name : "Employee"                                     560
    ■ valueType : "MSO"
    ■ dataType : "com.appOrchid.qna.Employee"
    ■ fieldName : "employee"
    ■ displayName : "Employee"
    ■ domainId : "com.appOrchid"
    ■ subDomainId : "qna"
    ■ groupName : "com.appOrchid"
    ■ version : 0                        562
    □ {} dataSourcingFeatures
        ■ @class : "com.appOrchid.core.mso.feature.DataSourcingFeatures"
        ■ useOptimizedSourcing : false
        □ {} dataSourcingSystemDefinitions
            □ {} Department Data From DB
        ■ dataSourcingDefinitions : null
    □ [] relationships         564
        □ {} 0
        □ {} 1
            ■ @class : "com.appOrchid.core.mso.relationship.MSOAttributeRelationshipLink"
            ■ sourceMsoId : "com.appOrchid.qna.Employee"
            ■ targetMsoId : "com.appOrchid.qna.Employee"
            ■ type : "ATTRIBUTE"
            ■ link : "reports to"
            ■ relationshipType : "OneToOne"
            □ {} relationshipFieldMappings
                ■ propertyName : "manager"
    □ {} propertyRenderingFeatures————566
        □ {} empNo
        □ {} name
        □ {} dept
        □ {} gender
        □ {} city
        □ {} empId
        □ {} age
        □ {} manager
        □ {} hireDate               568
    □ {} derivedPropertyConfigs
        ■ idProperty : "empNo"
        ■ abstract : false
        ■ key : false
        ■ runtime : false
        ■ sortable : false
        □ [] traits
        □ [] trailings
        □ {} traitMethodConfigs
        □ {} properties
```

SYSTEM AND/OR METHOD FOR AN AUTONOMOUS LINKED MANAGED SEMANTIC MODEL BASED KNOWLEDGE GRAPH GENERATION FRAMEWORK

BACKGROUND

1. Field

This disclosure relates expressions of knowledge in a signal representing a graph. In particular embodiments, this disclosure relates to a signal representation of graph for use in one or more practical applications.

2. Information

Information is everywhere. A wide variety of information, such as, for example, business information, social information, service information, scientific information, environmental information, or the like is continually being generated, accessed, shared, collected, communicated, stored, or analyzed. Information databases or warehouses including, for example, relational, multi-dimensional, transactional, hierarchical, or other like information repositories are becoming more common place as well as related communications networks or computing resources that provide access to various types of information.

Today, a variety of information from a variety of sources may be used in some manner to analyze, visualize, forecast, leverage, etc. various social, political, geographical, regulatory, business, or like segments to facilitate or support intelligent approaches for business decision-making, performance management, market research, situational awareness, or the like. For example, information may be used by project or performance management applications to deliver tailored approaches helping to gain a competitive advantage by improving work-flow or operating procedures, acquiring business insights, assessing risks or opportunities, creating or maintaining regulatory compliance infrastructure, or the like.

With an overabundance of diverse information being available or otherwise accessible, information processing tools or techniques continue to evolve or improve. At times, however, processing or organizing information may prove to be a computationally complex, time-consuming, or otherwise resource-demanding task, which may present a number of challenges, such as increased processing time, complexity, cost, or the like. Accordingly, how to process or organize diverse information in an effective or efficient manner continues to be an area of development.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIGS. 5C and 5D are examples of attributes that may be expressed in a container of an updated and/or created MSO according to example embodiments;

FIG. 6 is a graphical user interface (GUI) showing attributes of an MSO in a knowledge graph, according to an embodiment;

FIGS. 9C through 9F are schematic diagrams illustrating visual features in a graphical user interface that may be used to receive annotations according to an embodiment.

Figure 1:
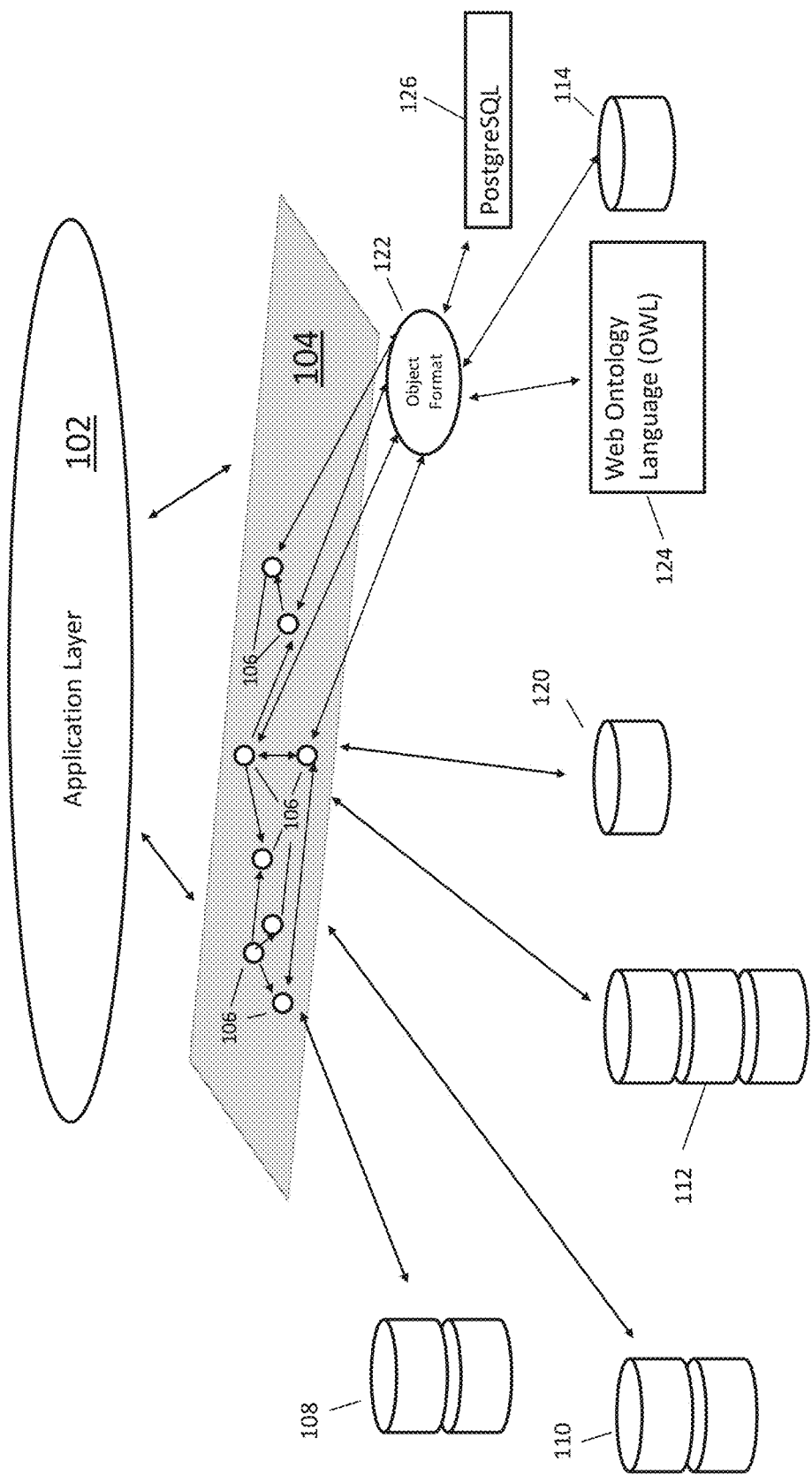
FIG. 1 is a schematic diagram of an embodiment of a system to employ managed semantic objects (MSOs) in a processing environment according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents. Further, it is to be understood that other embodiments may be utilized. Also, embodiments have been provided of claimed subject matter and it is noted that, as such, those illustrative embodiments are inventive and/or unconventional; however, claimed subject matter is not limited to embodiments provided primarily for illustrative purposes. Thus, while advantages have been described in connection with illustrative embodiments, claimed subject matter is inventive and/or unconventional for additional reasons not expressly mentioned in connection with those embodiments. In addition, references throughout this specification to "claimed subject matter" refer to subject matter intended to be covered by one or more claims, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

According to an embodiment, to assist in storage and/or retrieval of items stored in a physical memory, a computerized system may express features relating to such stored items in a graph including nodes representing objects and edges connecting such nodes to represent relationships between and/or among such objects. In this context, the term "graph" as used herein is to mean one or more signals and/or memory states expressing such objects and edges. According to an embodiment, one type of graph, a knowledge graph (KG) may be useful in certain artificial intelligence (AI) and/or machine learning (ML) applications. For example, may enable enhancing search results from multivariate sources.

According to an embodiment, nodes of a KG may express a hierarchy in an ontology as static features lacking any expression of an ecosystem from which such features are/ were derived. For example, features of a KG may be lacking in indications provenance and/or sourcing of such features. Additionally, a KG and associated ontology may be lacking in accuracy and/or detail in representing everyday life, and therefore may not be sufficiently actionable in AI and/or ML applications. For example, static features of a KG may be declarative and not represent an entire universe of relationships or have a very superficial representation of relationships.

One challenge in training AI and/or ML models is procuring and/or generating sufficient training parameters as there is a lack of automated tools to procure and/or generate training parameters. For example, a particular ontology and/or KG may not enable sufficient creation of training parameters, user interface and/or models to be effective in some applications. Additionally, a KG and/or ontology may be limited in an ability to assist in development of an enterprise AI model that incorporates an understanding of a business purpose. For example, a KG may be based solely on immediately observable facts and may not truly capture domain/Tribal Knowledge, data sourcing and interdependencies. For instance, a KG may be trained on curated observation sets that don't generalize well to a diversity of domain specific enterprise problems. As such, some KGs may be based solely on immediately observable facts and may not be able to use evidence, inference and confidence to build reinforced learned training sets. Also, a KG may comprise a single massive knowledge graph that may be used to express relationships, which may be limited by storage capacity and therefore limit relationships that may be learned and incorporated in a practical application. Particular implementations as described herein are directed to ontologies and/or KGs to assist in expressing relationships between and/or among real-world aspects, and thus enable more efficient and/or effective generation of training parameters. In some implementations of a KG, a node may express features of a semantic object having a semantic relationship to other semantic objects in a knowledge base. Such a semantic relationship between and/or among semantic objects in a knowledge base may be expressed as one or more edges in a KG connecting nodes in the KG representing such semantic objects.

According to an embodiment, a KG may employ evidence, inference and/or confidence to reinforce learned training parameters. In an example implementation, actionable features of a knowledge base may be expressed as managed semantic objects (MSOs) implemented as nodes of a KG. In an implementation, an MSO may comprise a semantic object further enhanced to include a container expressing features of a real-world object to be managed, cached and/or stored electronically. According to an embodiment, a "container" may comprise a data structure that stores objects in an organized way that follows specific access rules. Particular embodiments discussed herein are directed to generating and updating MSOs for use in expressing relationships between and/or among real-world objects.

In an embodiment, MSOs may represent everyday objects, such as business objects, that are linked and/or joined by edges enabling machines to comprehend everyday occurrences in a digital form. Use of MSOs in a KG may enable representation of behavior, interactivity, language model representations, user interface, and source and lineage of incorporated features to enable accurate and useful expressions of real-life objects. For example, a customer "pays" bills may be expressed in a KG and/or ontology of a customer. In an implementation, a container of an MSO expressing such a customer may include certain details of what payment entails, where payment is sourced from, how payment is shown/verified and/or how a customer behaves if such payment is delinquent. Such a container of an MSO may facilitate further development of enhanced nodes in a KG to exploit AI and other learning techniques to express internodal relationships.

Tags in a container of an MSO may represent real-world sentences to express, for example, a high-level description and/or narrative associated with and/or descriptive of a real-world object expressed by such an MSO. Such tags may enable searching and/or indexing to identify all or at least some MSOs related to a query if multiple MSOs are connected by edges in a KG, for example. In an implementation, a natural language query may "trigger" an MSO to reveal relationships that may fulfill and/or answer such a query. If such a natural query relates to an object that is not expressed as an MSO in a KG, a new MSO may be created that is capable of revealing features and/or relationships to answer such a natural language query. In an embodiment, a process to update a KG to include such a new MSO may incorporate not only observed facts and/or institutional knowledge, but also tribal/domain knowledge.

FIG. 1 is a schematic diagram of an embodiment of a system 100 to employ managed semantic objects (MSOs) 106 in a processing environment according to an embodiment. Application layer 102 may comprise one or more applications to be hosted by and/or executed on one or more computing devices (not shown). In an example implementation, application layer 102 may comprise any one of several types of application programs such as, for example, AI and/or ML application programs as business applications or analytical applications. In an embodiment, an application in application layer 102 may access electronic document(s) 104 to, for example process a query such as a natural language query. In an implementation, an MSO 106 may express locators and/or pointers indicating locations in one or more databases maintaining knowledge that may be used, for example, to respond to and/or answer such natural language queries, for example. Knowledge stored in such databases may be fetched and/or accessible through a portal, and may include databases 108, 110, 112 and 120. Databases 108, 110, 112 and 120 may comprise databases specialized for specific functions and/or types of knowledge to be stored and retrieved. For example, databases 108, 110 and 112 may comprise databases specialized for "hot" storage, "warm" storage and "cold" storage, respectively. For example, database 108 may be configured for "hot" storage to store knowledge that is to be accessible with very low access latency (e.g., H2/MemSQL/Redis). Database 112 may be configured for "cold" storage to store knowledge that is expected to be accessed less frequently and/or with longer allowable access latencies (e.g., Hadoop/Hive/SAP). Database 110 may be configured for "warm" storage to store knowledge expected to be accessed with greater frequency and/or with shorter access latencies than knowledge stored in database 112, but accessed with less frequency and/or with longer access latencies than knowledge stored in database 108. Database 120 may be configured to comprise features of a search database (e.g., Elastic search and/or SOLR). For example, database 120 may comprise indexing databases enabling immediate response from a search query. According to an embodiment, an MSO 106 and its attributes may have additional indicators of particular types of stored knowledge (e.g., "cold", "hot," "warm" and/or "search" knowledge maintained in databases 108, 110, 112 and/or 120) that are related to individual attributes of that MSO 106. In an example scenario, maintaining knowledge regarding ten million customers to be readily available in memory (e.g., at a single storage location) for processing may be extremely computationally intensive and expensive, if not impossible. To address this challenge, knowledge regarding customers relating to events in years 0-1 may be maintained as "hot" knowledge (e.g., in database 108), knowledge regarding customers relating to events in years 1-5 may be maintained as "warm" knowledge (e.g., in database 110), and knowledge regarding customers relating to events prior to year 5 may be maintained as "cold" knowledge (e.g., in database 112).

According to an embodiment, electronic document(s) 104 may comprise one or more KGs including MSOs 106. In an implementation, an MSO 106 may include and/or express an "affiliation" field pointing to other MSOs 106 (e.g., expressed as edges) according to a relationship. Such relationships may be manually specified with tribal knowledge and/or specified via training (e.g., training in the course of an AI and/or ML application). An MSO may also comprise metadata (e.g., in the form of tags as discussed above) in a persistent layer expressed in any one of several formats. In a particular implementation, MSOs 106 may be stored in a configuration database, such as a database formatted according to a particular object format 122 (e.g., JavaScript Object Notation (JSON)). This may enable maintaining MSOs 106 in a graph database 114 (e.g., according to Neo4J) or exporting MSO 106 according to Web Ontology Language 124, for example. According to an embodiment, a KG in electronic document(s) 104 may grow overtime through, for example, additions of MSOs 106 and/or edges. Once a KG grows to a particular size, all or a portion of the KG may be stored in graphical database 114 to reduce features of the KG in electronic document(s) 104.

In addition to locators and/or pointers indicating locations in one or more databases, an MSO 106 may include metadata including fields and/or tags to express sourcing features and/or other features descriptive of a real-world object represented by the MSO 106.

Figure 2:
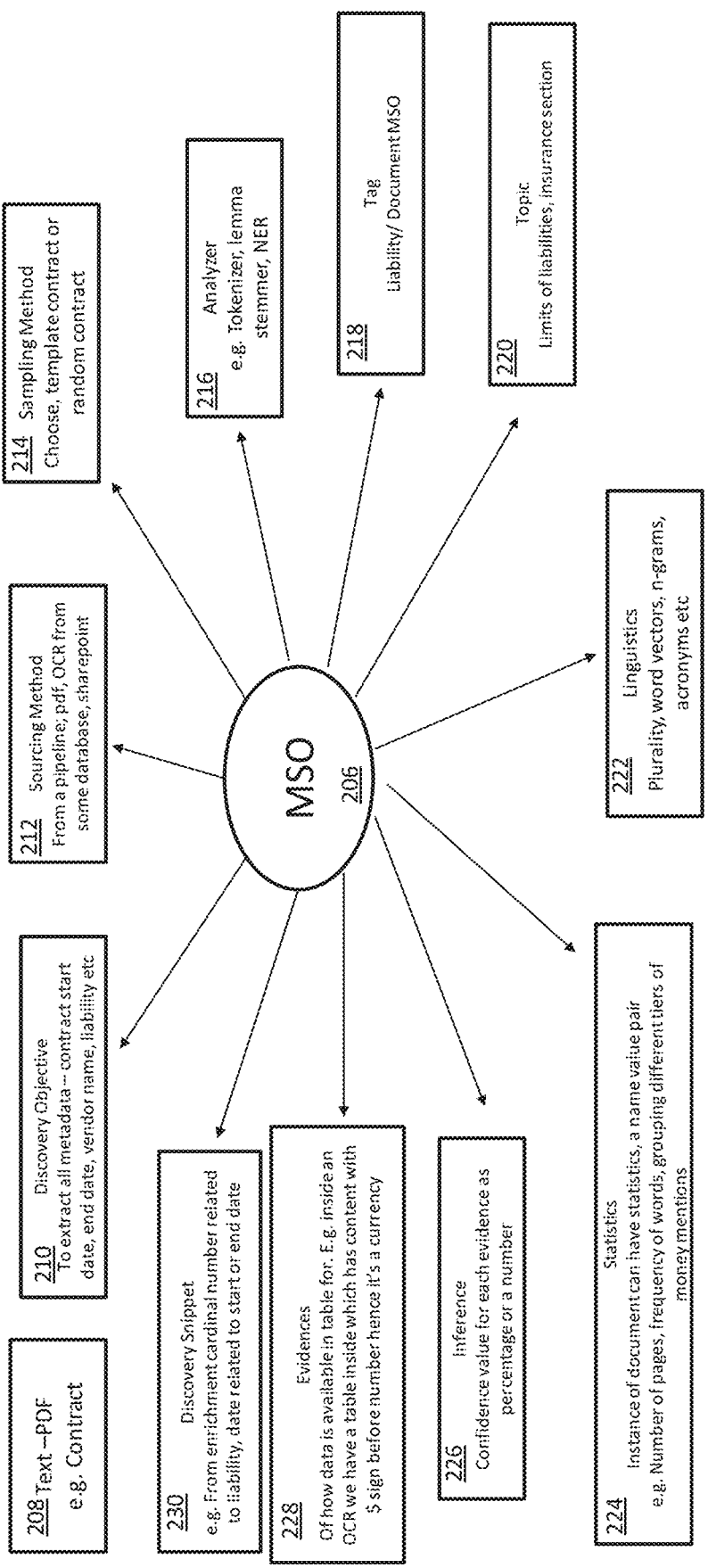
FIG. 2 is an illustration of features of an MSO according to an embodiment.

FIG. 2 is an illustration of features of an MSO 206 according to an embodiment. One or more features of MSO 206 may be implemented in features of one or more MSOs 106 (FIG. 1). Features and/or attributes expressed in MSO 206 may enhance accessibility domain specific knowledge (e.g., through pointers to external knowledge bases). In the presently illustrated embodiment, MSO 206 expresses features of a real-world object such as a contract in a specific document format such as Adobe® PDF. It should be understood, however, that this is merely an example of a real-world object that may be represented by an MSO in a KG, and claimed subject matter is not limited in this respect. Metadata items 210, 212, 214, 216, 218, 220, 222, 224, 226, 228 and 230 may be maintained in a container to be a part of MSO 206 (e.g., as part of a stored KG).

In an embodiment, MSOs may provide baseline representations of real-world objects such as business objects. Edges in a KG may join such MSOs to enable machines to comprehend everyday occurrences in digital form. According to embodiments, MSOs may enhance a KG to represent, for example, behavior, interactivity, language model representations, user interface, source and/or lineage of knowledge to assist with accurate depictions of real-world objects. For example, a customer "pays" bills may be part of KG and/or ontology of a "customer." Nevertheless, particular details of what payment entails, where such payment is sourced from, how such payment is to be presented, how such a customer behaves if payment is delinquent may be absent from such a KG and/or ontology. MSOs may provide a container for developing enhanced nodes of a KG and/or ontology to include features that further enable AI and other learning methodologies to develop internodal relationships and consequently create KGs and ontologies. Specific fields of a container of an MSO may include metadata that facilitates use and/or utility of items of knowledge to which the MSO points to and/or references (e.g., specific items of knowledge stored in databases 108, 110, 112 and/or 120 and pointed to and/or referenced by an MSO 106). In a particular implementation, such metadata may specify formats, data types, cardinality, statistics (e.g., average, sum, standard deviation, variance, etc.) and/or other attributes of accessible items of knowledge enabling efficient use such as in processing natural language queries. Such metadata may also characterized databases in which referenced knowledge items are stored (e.g., characterized as knowledge maintained in "cold," "hot," "warm" or "search" type database)

Figure 3A:
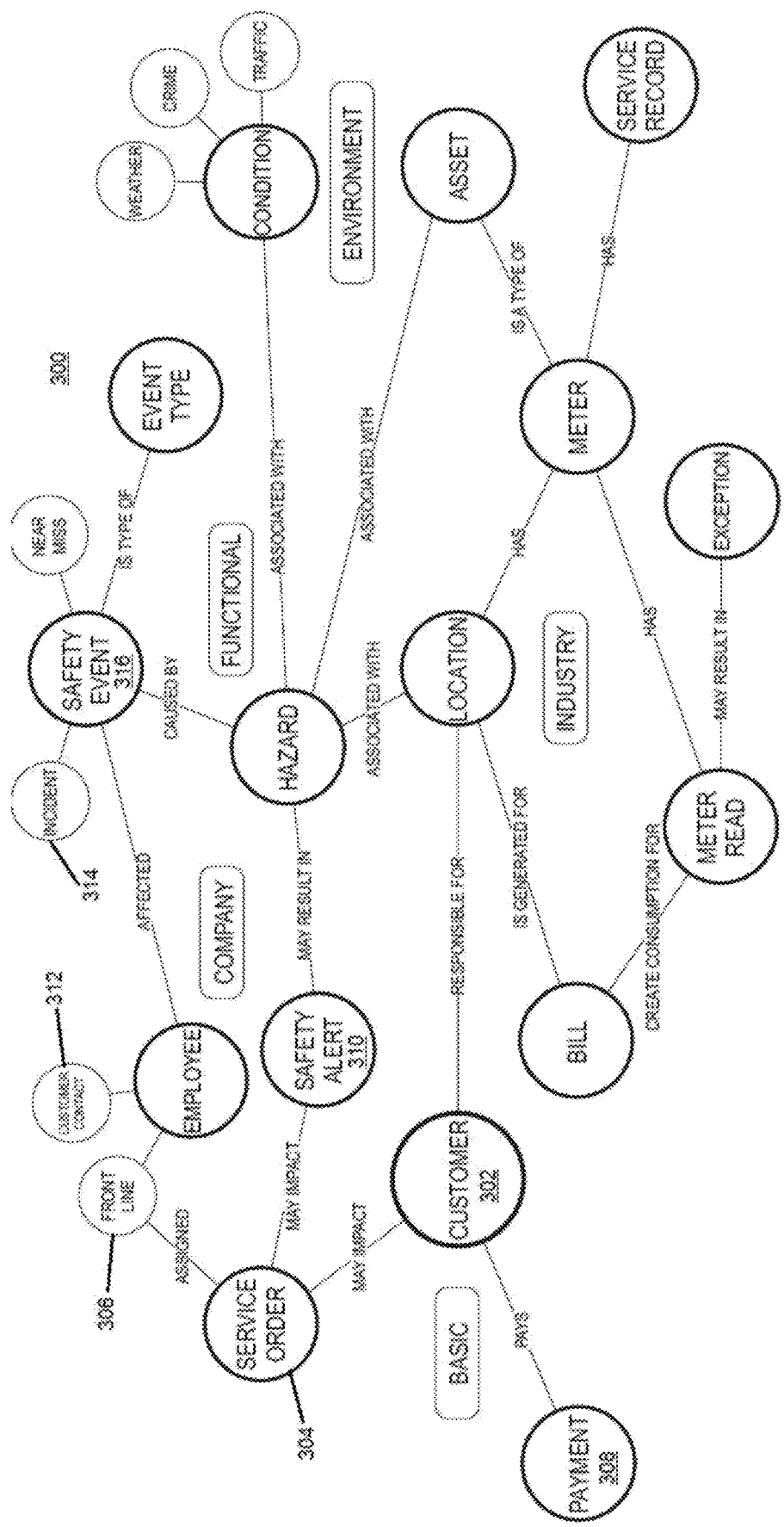
FIG. 3A is an illustration of a graph including MSOs connected by edges according to an embodiment.

Continuing with the above example, FIG. 3A is an illustration of a KG 300 including MSOs connected by edges for an ontology of a "customer" according to an embodiment. In a particular implementation, KG 300 may be manually created initially by identifying and representing connections between and/or among a plurality of MSO's. An MSO generation platform (e.g., processing system 500 shown in FIG. 5) may then automatically learn affiliations to form new connections to reinforce affiliations of existing MSOs, which may lead to a further evolution of KG 300. Additional MSOs for KG 300 may also be created, enabling KG 300 to grow in breadth (e.g., "horizontally") and/or in depth (e.g., "vertically") as illustrated in FIG. 3A.

As shown in FIG. 3A, KG 300 may define MSOs has having different "depths" in an ontology (e.g., according to hierarchy). For example, KG 300 may express MSOs such as customer MSO 302, payment MSO 308, service order MSO 304, safety alert MSO 310 and/or safety event MSO 316 as having a relatively "higher" depth. Other MSOs connected to such relatively higher depth MSOs may comprise MSOs having a relatively "lower" depth such as front line MSO 306, customer contact MSO 312 and/or incident MSO 314.

In an embodiment, MSOs (such as lower depth MSOs identified above) may be a part of multiple ontologies and/or KGs. For example, once an affiliation(s) between MSOs are defined in a KG, the MSOs may be associated with other MSO's using edges in the KG. As shown in FIG. 3A, customer MSO 302 is connected with payment MSO 308 using 'pays' relation edge. Similarly, customer MSO 302 is connected with service order MSO 304 using 'may impact' relation edge. In an embodiment, relation edges between MSOs in a KG may be semantically defined. In an implementation, an edge in combination with two MSOs connected by the edge may define a complete sentence. For example, an ordered concatenation of "pays" relation edge in combination with customer MSO 302 and payment MSO 308 may define a sentence as "Customer pays payment." Here, such an ordered concatenation may be defined at least in part by a directionality of "pays" relation edge (e.g., directionality from customer MSO 302 to payment MSO 308). Similarly, an ordered concatenation of "may impact" relation edge in combination with customer MSO 302 and service order MSO 304 may define a sentence as "Customer may impact service order." Again, such an ordered concatenation may be defined at least in part by a directionality of "may impact" relation edge (e.g., directionality from customer MSO 302 to payment MSO 308).

While KG 300 shows single relation edges connecting MSOs, in other embodiments two MSOs in a KG may be related and/or connected by multiple different relation edges having the same or different directionality between MSOs. According to an embodiment relation edges connecting and/or relating MSOs in a KG may be created to express a "single hop" relationship (e.g., relating two MSOs) or a "multi-hop" relationship (e.g., relating three or more MSOs). Such a single hop relationship may be implemented as a relationship expressed as a transition from MSO4 to MSO2 shown in FIG. 3C while a multi-hop may be implemented as a relationship expressed as a transition from MSO4 to MSO6 through MSO2 and MSO8. A manual creation of a single relation edge may employ natural language queries to enrich relationships (e.g., based on statements and/or tribal knowledge).

Any one of several mechanisms may be used for creating relation edges between and/or among MSO's in a KG. In one example, such a mechanism may comprise a particular mechanism for creating a single edge (e.g., expressing a single hop) or a particular mechanism to create a multi hop relationship. In an embodiment, a single relation edge may be created manually or automatically (e.g., using AI and/or ML techniques). In a manual creation of a relation edge, for example, a natural language query (e.g., a plain English query) may be used to enrich MSO relationships based, at least in part, on statements from a domain expert automatically parsed via natural language processing (NLP) techniques to generate connections between and/or among ontologies. These connections may be further defined at a tag and/or topic and/or behavior level aspect of an MSO container.

According to an embodiment, one or more AI and/or ML techniques, such as automatic AI based tag creation technique, Bidirectional Encoder Representations from Transformers (BERT)/XLNet method, 2D CNN, Named Entity Recognition (NER) may be used for creating single relation edges between and/or among MSOs in a KG.

According to an embodiment, a linguistic component of an MSO may contain parameters to enable NER and dependency/constituency parsing for that MSO. A textual pattern obtained from the linguistic component (dependency/constituency parsing) may be embedded into a vector space and fed into a convolutional network. Such a convolutional network may then be combined with logical rules using NER. As such, MSOs that have similar profiles with respect to associated linguistic components may thus be connected with a relation edge to express this similarity in profiles.

Figure 3B:
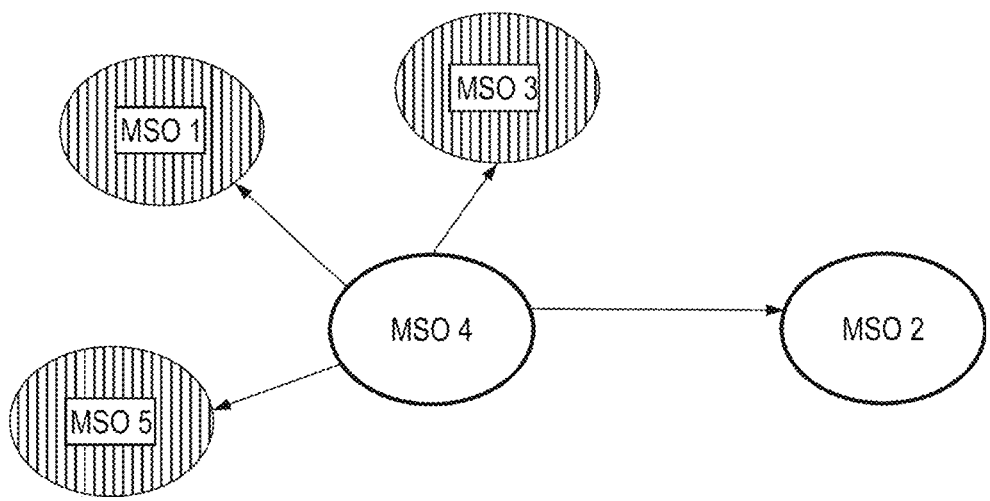
FIGS. 3B, 3C and 3D are illustrations of graphs of different ontologies sharing a common MSO according to particular embodiments.

According to an embodiment, a mechanism to create a multi-hop relationship among MSOs in a KG may employ AI and/or ML composition techniques such as, for example, Long Short-Term Memory (LSTM) or gated recurrent units in a recurrent neural network (RNN), just to provide a couple of examples. As shown in the particular example of FIG. 3A, multiple MSOs may be related linearly (e.g., in sequence and unidirectionally). FIG. 3B shows a particular example embodiment in which three or more MSOs are connected by single relation edges without feedback in that MSO1 is connected to MSO2, which is further connected to MSO3. A relation between MSO1 and MSO3 may be modeled as a multi-hop relationship separately as MSO1 and MSO3 are not connected by a single relation edge to be treated as single hop after obtaining the single hop edges.

As discussed above, a relation edge may specify a directionality. In an embodiment, a portion of a KG and/or ontology may be defined, at least in part, by a triplet, two MSOs and a relation edge expressing a directional relationship between the two MSOs. As pointed out above, an MSO may comprise a container indicating multiple attributes and/or features. According to an embodiment, multiple relation edges may connect various attributes of a first MSO with attributes of a second MSO to provide a "bundle" of relation edges as an "edge construct". Multiple edges in such an edge construct may express features that, in combination, provide a unique signature between MSOs. Relation edges of an edge construct may be projected as vector or latent variable space in an ontology. In an embodiment, as a natural language query may be parsed as part of a process to answer such a natural language query, for example, certain MSOs in a KG may be initially identified as being relevant to such a natural language query. A generative model may then predict which relation edges coupled to such relevant MSOs are most relevant to such a natural language query for single hop and multi hop connections. Accordingly, depending on a particular natural language query, multiple groups of relation edges may be identified as being potentially relevant to enable broad coverage in identification of relevant MSO.

Figure 3C:
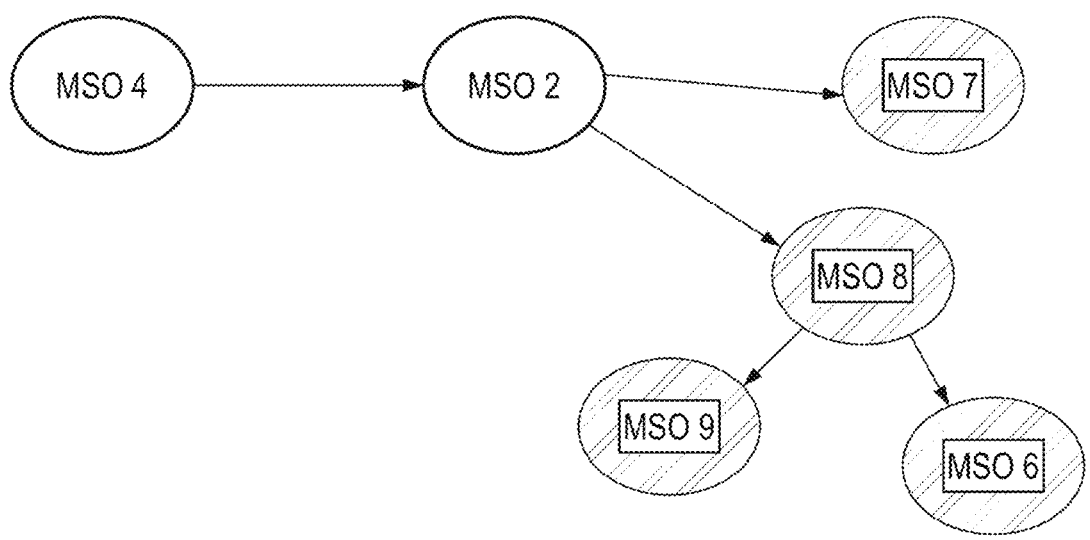
Figure 3D:
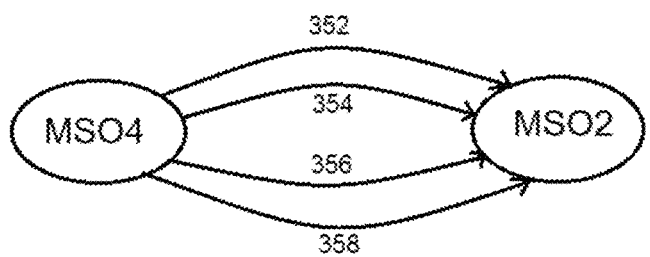

According to an embodiment, an MSO in one KG and/or ontology may be further characterized being in one or more additional KGs and/or ontologies. A KG may be constructed to belong to multiple ontologies, and edges connecting MSOs in such a KG may impart a particular depth. For an MSO in multiple ontologies and/or KGs, edges to such an MSO in part expressing a multi-hop relationship may be different depending on which particular KG and/or ontology to which the MSO is to belong. A KG and/or ontology "A"

shown in FIG. 3B may include four different MSOs: MSO1; MSO3; MSO4; and MSO5. As MSO4 is shown to be connected with MSO2 by a relation edge, MSO2 and MSO4 may belong to KG and/or ontology A. According to an embodiment, MSO2 may also be connected by relation edges to MSO7 and MSO8, which are a part of a different KG and/or ontology, KG and/or ontology B shown in FIG. 3C. In an implementation, as MSO4 and MSO2 are connected by relation edges, MSO 4 may also become a part of KG and/or ontology B. Accordingly, MSO4 and MSO2 may be both be a part of multiple KGs and/or ontologies. An edge construct between MSO4→MSO2 as part of KG and/or ontology A (FIG. 3B) may have a particular "bundle" of information relevant to KG and/or ontology A. In contrast, such an edge construct between MSO4→MSO2 as part of KG and/or ontology B (FIG. 3C) may have an entirely different "bundle" of information that is relevant to KG and/or ontology A. While FIGS. 3B and 3C show a single edge connecting MSO4 and MSO2, it should be understood that, as illustrated in FIG. 3D, an edge construct relating MSO4 and MSO2 may include a "bundle" of multiple edges including different information depending, at least in part, on whether particular edges are to express a relationship in KG and/or ontology A or a relationship in KG and/or ontology B. For example, edges 352 and 354 may comprise a bundle relevant to a relationship between MSO4 and MSO2 in the context of KG and/or ontology A, while edges 356 and 358 may comprise a bundle relevant to a relationship between MSO4 and MSO2 in the context of KG and/or ontology B.

Figure 4:
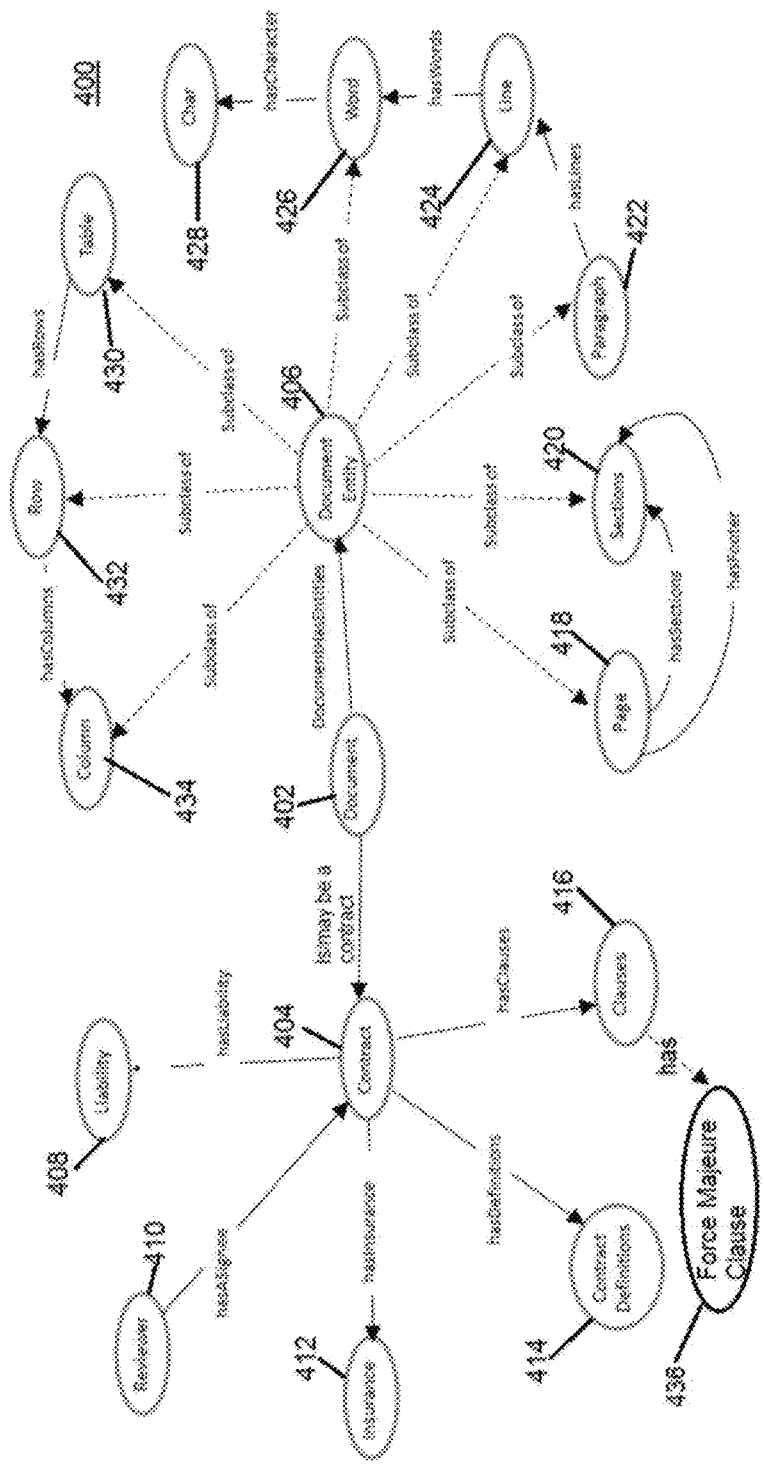
FIG. 4 is an illustration of a graph connecting MSOs by edges according to an ontology in which is capable of fully servicing a query according to an embodiment.

FIG. 4 is an illustration of a graph connecting MSOs by edges according to an ontology 400 in which is capable of fully servicing a query according to an embodiment. As shown, an MSO 402 expresses a "document" that may be a "contract" represented by MSO 404 connected to MSO 402 by an edge labeled "Is a Document" to indicate that a contract is a type of document. MSO 404 is connected to MSOs 408, 410, 412, 414 and 416 to indicate possible components of a "contract" represented by MSO 404. MSOs of KG 400 may be traversed to respond to a natural language query regarding such components of a "contract" represented by MSO 404. In an example embodiment, MSO 436 may not exist prior to servicing of a natural language query regarding the existence or details of a "force majeure" clause of a contract. Here, responsive to this natural language query (which may not be answerable prior to existence of MSO 436), one or more processes (e.g., performed by processing system 500 (FIG. 5A)) may create MSO 436 (which may be used to answer similar natural language queries in the future). While MSOs 404, 408, 410, 412, 414 and 416 may be directed to content of a document, MSOs of KG 400 may similarly be traversed to respond to a natural language query regarding specific format-dependent attributes of a "document entity" represented by MSO 406. For example, format dependent attributes of a document may, through MSO 406, trigger MSOs 418, 420, 422, 424, 426, 428, 430, 432 and/or 434 may be triggered.

Figure 5A:
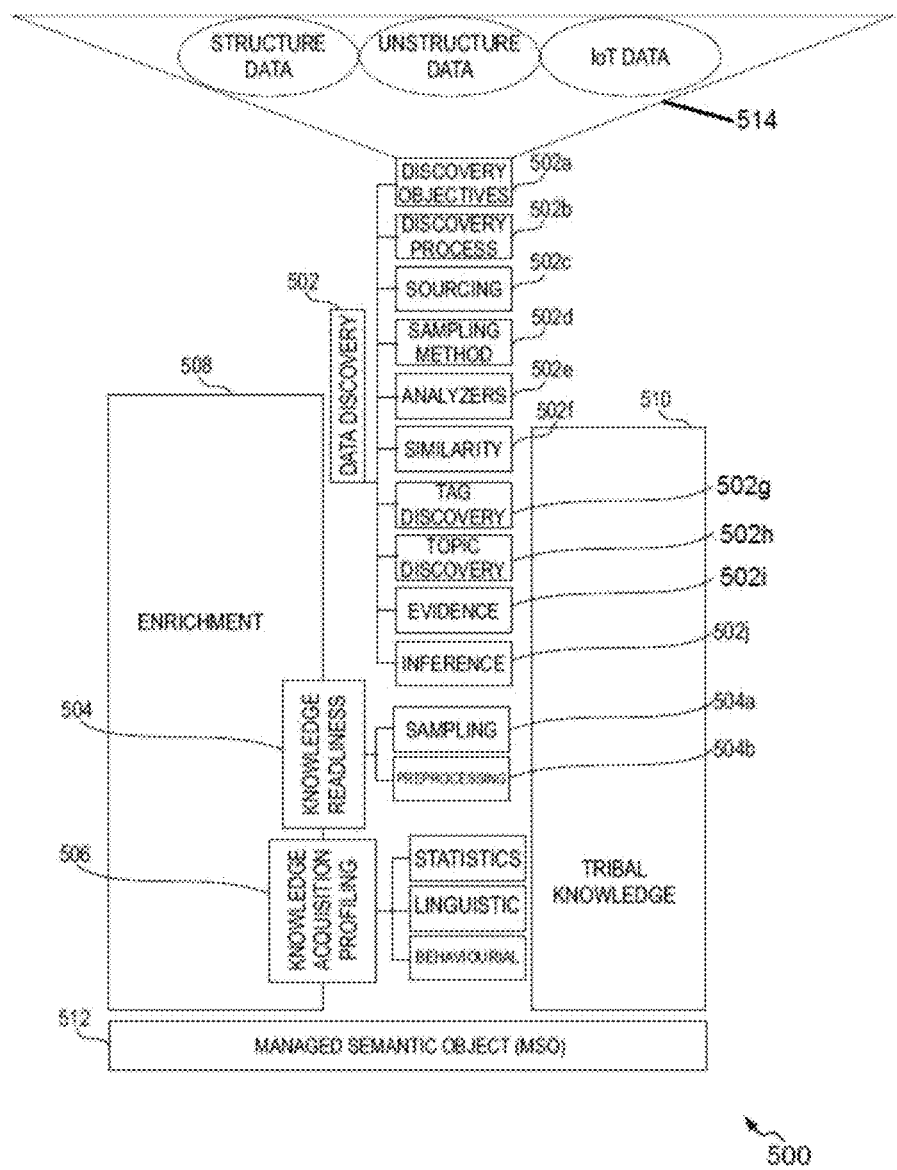
FIG. 5A is a schematic diagram of features of a processing system to update a signal expression of a graph according to an embodiment.
Figure 5B:
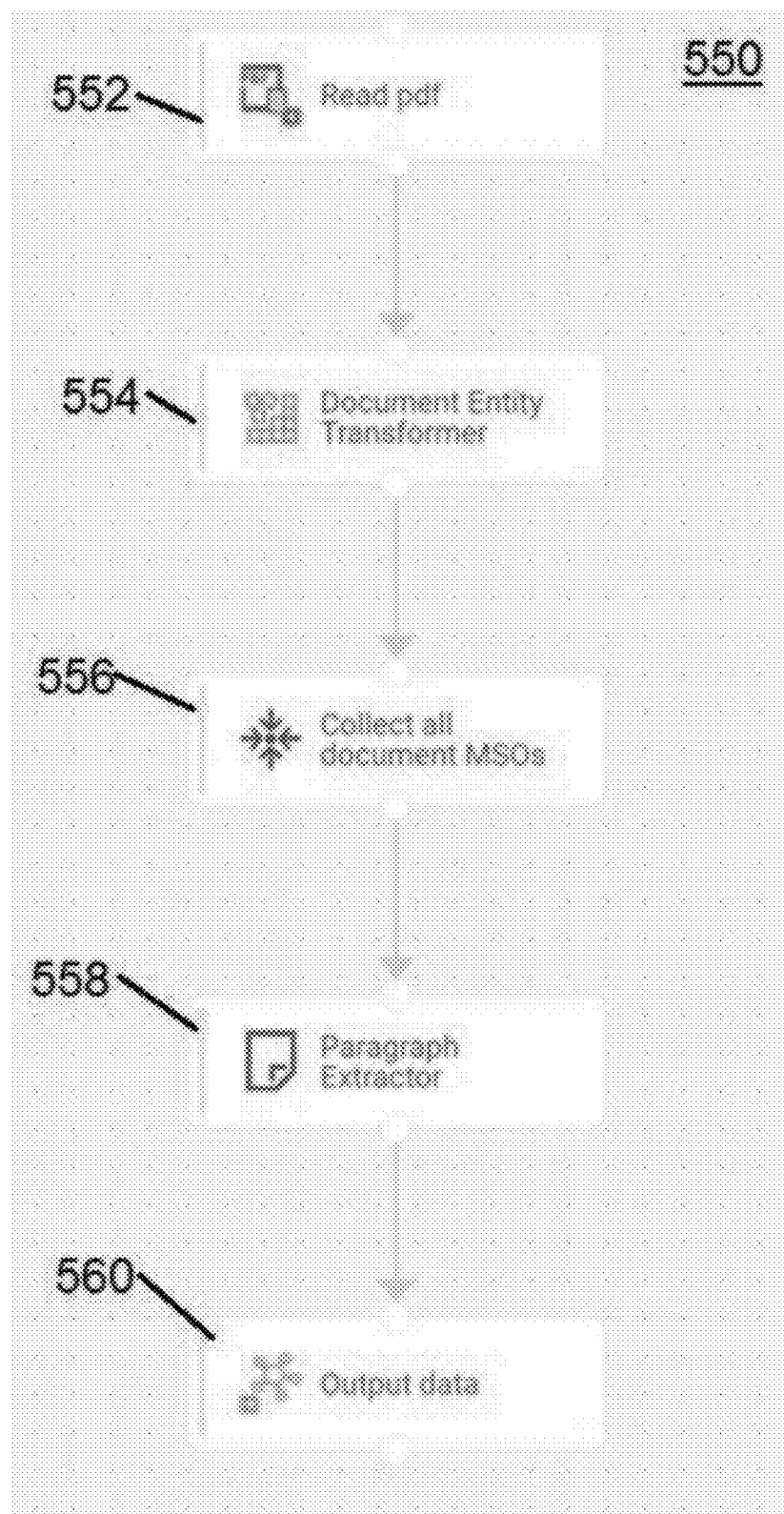
FIG. 5B is a flow diagram of a pipeline process to extract knowledge from a source according to an embodiment.

FIG. 5A is a schematic diagram of features of a processing system 500 to update a signal expression of a graph according to an embodiment. For example, features of processing system 500 may be used for creating MSOs of a KG and/or ontology, in accordance with an example embodiment. In a particular implementation, processing system 500 may create and/or update MSOs of a KG and/or ontology expressed and/or represented in one or more electronic documents (e.g., create and/or update MSOs 106 in a KG of electronic document(s) 104, FIG. 1). According to an embodiment, a baseline ontology of an MSO may be predefined based, at least in part, on a discovery process (e.g., manual discovery process) and/or aspects of a business model (e.g., descriptive of how customer relationships and/or transactions are to be managed). Operations of processing system 500 may be implemented and/or executed by one or more computing devices responsive, at least in part, to particular events. Such events may comprise, for example, receipt of a query, identification of a new customer, detection of new items of knowledge, identification of new types of knowledge, implementation of a new step or process in analysis/visualization or a new application, just to provide a few examples of events that may initiate execution of processing system 500. It should be understood that presentation of operations of processing system 500 in a particular sequence is not intended to so limit execution of operations of processing system 500 to any particular ordered sequence, and that execution of operations of the processing system 500 may occur in any sequence and/or order. Also, operations of processing system 500 need not to be executed in the same order as presented in FIG. 5A. Further, multiple operations of processing system 500 may be grouped together and/or performed in a single operation, or that execution of a single operation may entail execution of multiple sub-operations executed concurrently or sequentially. Additionally, it should be understood that operations of processing system 500 are merely illustrative of a processing system to create and/or update MSOs in an KG and/or ontology in a particular embodiment. For example, it should be understood that a processing system may employ additional operations, fewer than an entirety of operations shown in FIG. 5A and/or different operations altogether.

Discovery operation 502 may entail discovering and/or extracting features related to one or more of a plurality of knowledge sources 514 (e.g., knowledge sources including structured knowledge, unstructured knowledge and/or IoT knowledge) to, for example, at least in part determine features of an MSO. Discovery operation 502 may be initiated, for example, responsive to a query that may not be completely answerable based on an existing KG and/or ontology. Structured knowledge of knowledge sources 514 may comprise, for example, documents and/or databases in which knowledge is well organized according to a well defined format. Such a well defined format may enable simple retrieval and/or recognition of particular items of interest (e.g., in response to a natural language query) from specific fields and/or records. Unstructured knowledge from knowledge sources 514 may comprise, for example, documents and/or other collections of knowledge in a relatively undefined format. Such unstructured knowledge may comprise, for example, samples and/or observations of signals (e.g., sensor signals generated responsive to some physical phenomenon) to which additional processing may be applied to provide measurements and/or support inferences. In a particular implementation, knowledge obtained from particular devices (e.g., so-called "Internet-of-Things" (IoT) devices) may comprise a mixture of structured knowledge and unstructured knowledge.

In the particular illustrated embodiment, operation 502 may comprise a combination of operations 502a through 502j. At operation 502a, a knowledge discovery strategy/objective may be specified to, for example, identify knowledge sources, fields and/or attributes in knowledge sources to be used in sourcing knowledge relevant to a query. A knowledge discovery objective may, for example, define a purpose behind an extraction of knowledge along with any expertise that may enable execution of operation 502 to achieve such a defined purpose. Such a discovery objective may also define a particular strategy to extract and/or obtain knowledge to support/satisfy such a defined purpose. Such a particular strategy may specify, for example, a particular lineage for knowledge to be extracted (e.g., to reduce and/or eliminate bias). In a particular implementation, a discovery objective determined at operation 502*a* may be defined manually based on a particular use case. According to an embodiment, operation 502*a* may comprise scanning, browsing and/or selectively extracting knowledge from knowledge sources 514 including, for example, features and/or attributes from particular knowledge sources including documents, tables, figures, pictures, videos and/or audio files, for example, to develop new objects and/or entities such as MSOs in a KG. In a particular example, a knowledge source may make available an Adobe® PDF document containing a financial report such as a balance sheet. Such a balance sheet may express attributes and/or features that are indicative of profit and/or health of a company and that are of interest to an investor. In this example, operation 502*a* may define a balance sheet as a discovery objective and aspects of processing system 500 may automatically identify documents that may contain such a balance sheet. Similarly as applied to the particular example KG and/or ontology of FIG. 4, processing system 500 may automatically identify documents that may contain a contract. According to an embodiment, once a particular discovery objective is determined at operation 502*a* for a particular use case (e.g. for an ontology relating to a first business entity), the particular discovery objective may be applied for another, similar use case (e.g., for an ontology relating to a second business entity having operations similar to the first business entity). Once defined, particular discovery objectives may be automated for similar use cases.

According to an embodiment, operation 502*b* may, at least in part, determine a process to fulfil a discovery objective such as, for example, a discovery objective determined at block 502*a*. In a particular implementation, operation 502*b* may include a determination of actions that may be performed to enable successful achievement of a discovery objective. In the particular example of a balance sheet as a discovery objective, operation 502*b* may identify a first action as opening a relevant document based on a rule, such as "show documents that belong to a district in a state", a second action to "parse" opened documents to identify artifacts having features/attributes of a table, a third action as "locate tables having particular features/attributes of a financial statement," and so on. Likewise in the particular example KG and/or ontology of FIG. 4, a discovery objective determined at operation 502*a* specify location of a force majeure clause. Here, operation 502*b* may identify a first action as opening a relevant document based on a rule, such as "show contract clauses", and second action to "parse" opened documents to identify artifacts having features/attributes such as the phrase "unforeseeable circumstances."

According to an embodiment, operation 502*c* may, at least in part, determine a methodology for sourcing relevant attributes and/or features from one or more source documents and/or other relevant knowledge. A sourcing methodology may be specified as, for example, a field mapping or an expression that is derived based on various conditions for sourcing relevant attributes and/or features. Continuing with the example discovery objective being a balance sheet, for instance, a source document and/or other relevant knowledge may comprise a PDF artifact identified as 'XYZ'. Such an artifact may be mapped and/or transformed to have particular business relevance to an MSO in a KG and/or ontology. For example, such a process of mapping and/or transforming attributes of a source document and/or other knowledge may map and/or transform such attributes to attributes according to predefined features of an MSO. This may enable processing system 500 to generate and/or update MSOs that incorporate attributes of real-world business objects. In a particular implementation, knowledge that has been mapped, transformed or otherwise processed (e.g., processed structured and/or unstructured knowledge) may be maintained in a knowledge "sink" to be available for reuse in generating and/or updating MSOs. In an example implementation, for the purpose of illustration of a mapping and/or transformation of an item of knowledge for incorporation in an MSO, an item of knowledge to be incorporated as features of one or more MSOs may comprise a legal contract in a specific electronic document format such as Adobe® PDF comprising free form running text in legal parlance. Here, it may be desired to extract terms such as "insurance liability," "force majeure" or "contract period" to be in a more structured and consumable format. These extracted terms may be incorporated into an "insurance" MSO, "force majeure" MSO or "time" MSO, for example. According to an embodiment, such a process to extract features of a document in a specific format may be performed according to process 550 in FIG. 5B. Here, blocks 552 through 560 may be performed sequentially in a pipeline fashion to extract features of an item of knowledge in an electronic document format such as Adobe® PDF. A document read at block 552 may be converted and/or transformed at block 554 to a consumable format (e.g., searchable text format). Block 556 may identify particular document features (e.g., contract terms such as insurance and/or time) in the converted and/or transformed document, and these identified document features may be parsed at block 558 to provide extracted knowledge at block 560. Extracted knowledge at block 560 may then be incorporated as features of MSOs of KGs and/or ontologies.

According to an embodiment, operation 502*d* may, at least in part, determine a methodology for sampling sources of relevant documents and/or other relevant expressions of knowledge of one or more knowledge sources. A particular sampling strategy may be applied according to a type of a knowledge source (e.g., structured or unstructured knowledge source) to limit discovery of knowledge from the knowledge source. For example, if source documents and/or other relevant expressions of knowledge are obtained from an unstructured knowledge source, then a sampling strategy defined for such unstructured knowledge may be used to limit knowledge that is to be obtained from source documents and/or other relevant expressions of knowledge. In an implementation, sampling at operation 502*d* may enable a preliminary analysis on a subset of items in a knowledge base to determine patterns and/or develop preliminary models and algorithms, or otherwise determine a "best" or optimal method to process items in an entire knowledge base. For example, sampling at operation 502*d* may enable a malleable approach to apply a variety of methods and/or models to avoid computationally intensive processing of an entirety of items in a knowledge base using a single model at the outset of an analysis of the knowledge base. Sampling of observations of knowledge at operation 502*d* may enable identification of particular data types (e.g., integer, string, etc.) In another implementation, from a knowledge base containing items representing 14 million customers, for example, sampling at operation 502*d* may enable determination of a relevant characteristic of an MSO from a random sampling of a smaller subset of the knowledge base (e.g., only 10000 items out of the 14 million total). In an embodiment, a sampling strategy may at least in part define a preferential rule, where a certain confirmation bias may be applied to reflect a certain idiosyncratic MSO behavior and/or idiosyncratic behavior of a real-world object to be modeled by an MSO. Sampled knowledge extracted according to operation 502d may be additionally processed for use in creating and/or updating MSOs. Knowledge sources 514 may comprise "streams" to provide time-varying signals and/or states representing real-time knowledge. Such time-varying signals and/or states may be weighted according to an a priori distribution (e.g., to suppress bias) and then sampled, for example. Additionally, samples and/or observations of such time-varying signals and/or states may be processed and/or formatted for further computation on a particular computing device. In a particular implementation, a process determined at operation 502d may be used to determine metadata that is to be expressed in an MSO container (e.g., at operation 512).

Operation 502e may comprise processing samples of relevant documents and/or other relevant knowledge such as, for example, samples obtained at operation 502d. For instance, operation 502e may use search and index analyzers to process text included in samples of relevant documents and/or items of knowledge along with linguistic values (e.g., linguistic rules) for processing sentences present in relevant documents and/or items of knowledge that are sampled. In an example implementation, operation 502e may employ search and index analyzers to perform pre-processing of samples of relevant documents and/or items of knowledge. Such pre-processing of samples of relevant documents and/or items of knowledge may comprise for example, eliminating/filtering noise, interpolation to identify missing values, eliminating stop words, performing spell/grammar checks, just to provide a few examples of pre-processing that may be performed at operation 502e.

Operation 502f may comprise application of one or more algorithms and/or methodologies to detect and/or measure similarities between and/or among various constructs based, at least in part, on samples of relevant documents and/or other knowledge (e.g., samples of relevant documents and/or other items of knowledge obtained from operation 502d and/or 502f). Such constructs may include, for example, words, paragraphs, sentences and/or other similar constructs present in samples of relevant documents and/or other items of knowledge. In an implementation, operation 502f may determine whether identified constructs exhibit pattern, trend and/or semantic similarities with other constructs present in samples of relevant documents and/or other items of knowledge. This may enable use of similar techniques to process new, similar knowledge items based on previous techniques with a high degree of confidence. In an embodiment, a measure of similarities between and/or among constructs may be expressed as a "distance" in some arbitrarily defined vector space, for example.

Operation 502g may comprise defining a methodology for discovering tags in sampled relevant documents and/or other relevant expressions of knowledge. In a particular implementation, a tag may comprise a well-defined label point such as a word, phrase or a small set of words. According to an embodiment, tags to be discovered using methodologies defined in operation 502g may include, for example, labels, annotations and/or symbols relating to an index and/or organization of a body of knowledge. Such tags may be defined manually in sampled knowledge (e.g., sampled according to methodologies determined at operation 502d), defined stochastically and/or defined according to established rules. Such tags may also be created using AI and/or ML techniques using classifiers, linear discriminant analysis (LDA) and/or language models including, for example, Bidirectional Encoder Representations from Transformers (BERTs), Generative Pretrained Transformer 3 (GPT3) or XLNet. In one automatic AI-based tag creation technique, evidence from an MSO container may provide labeling rules for models that use a generative-discriminative approach and/or other tagging/labeling models to automatically tag the MSOs. Operation 502g may determine tags based, at least in part, on acquired tribal knowledge. For example, operation 502g may determine tags for force majeure clauses of an MSO for particular type of contract based, at least in part, on tribal knowledge. In an embodiment, discovered tags may be indexed according to a particular context to enable quick retrieval of items of interest. In an embodiment, a process of "tag discovery" at operation 502g may identify new tags to be included in a container of an MSO. For example, operation 502g may be used in downstream processing for determining metadata that is to be expressed in an updated or created MSO (e.g., at operation 512).

Operation 502h may define a methodology discovering a "topic" in sampled relevant documents and/or other relevant expressions of knowledge. In an embodiment, a "topic" discovered in a relevant document and/or other relevant expression of knowledge may comprise attributes of a "tag" (e.g., as discovered in a process determined according to operation 502g) but also comprise a more complete narrative and/or explanation (e.g., more than just a word, label and/or small set of words). A topic may, for example, represent a body of work and may be followed by a section and/or a narration that details such a topic. Accordingly, one or more topics that are narrative and self-explanatory may be defined for sampled relevant documents and/or other expressions of knowledge. According to an embodiment, a process determined at operation 502h may be used to determine metadata that is to be used in downstream processing for determining metadata that is to be expressed in an MSO container. Alternatively, operation 502h may identify a topic that is to be applied across multiple MSOs in an ontology/KG. Such a topic attributed to multiple MSOs may enable determining which topic a particular MSO is to be associated with (e.g., to limit connections downstream).

Operation 502i may comprise determination of a process to collect one or more observations of evidence to ascertain whether certain collected knowledge is useful. As referred to herein, an "observation of evidence" is to mean an observation of a fact that, by itself or in combination with observations of other facts, tends to support or refute an assertion. In an embodiment, such observations of evidence may, for example substantiate an inference and/or set of beliefs for use in training a machine. In an embodiment, observations of evidence may be collected in the course of different actions performed during operations defined and/or determined at operation 502b for a discovery process, for example. Referring to the above example of a balance sheet, for instance, one or more observations of evidence may enable confirmation that a particular document and/or or other expression of knowledge comprises a financial document. Such observations of evidence to confirm that a particular document and/or other expression of knowledge comprises a balance may include observations of particular features such as the term "BALANCE SHEET" in prominent lettering, headings of column tables including a recent year, character strings appearing like currency values, terms such as "assets" or "liabilities", just to provide a few examples of observed features that may support an assertion that a particular document and/or other expression of knowledge comprises a balance. Additional observations of evidence may be extracted from such a document and/or other expression of knowledge upon such affirmation that a document and/or other expression of knowledge comprises a financial document. In an embodiment, a continuous collection of observations of evidence may be used to continually evaluate confidence in an assertion (e.g., to support or refute such an assertion). According to an embodiment, operation 502i may be used in downstream process for determining metadata that is to be expressed in an MSO container. In another embodiment, a process determined by operation 502i may be expressed in metadata of an MSO container to indicate, for example, a process of how an actual inference expressed in metadata is determined.

Operation 502j may, according to an embodiment, determine a process to reorganize a discovery process (e.g., a discovery process defined and/or determined at operation 502b) on the basis of observations of evidence (e.g., observations of evidence obtained according to a methodology determined in operation 502i). A methodology defined by operation 502i may, for example, determine a process to collect observations of evidence through a mechanism of to "boost" confidence in an inference or "block" confidence in such an inference. Such a mechanism to boost confidence in an inference may enhance and/or increase confidence in such an inference while such a mechanism to block confidence in an inference may reduce confidence in such an inference. A methodology determined according to operation 502j may maintain one or more confidence scores (e.g., one or more numerical scores) to reflect a level of confidence in an inference. Observations of evidence obtained in a discovery process found to support and/or increase confidence in an inference may increase such a confidence score while observations of evidence found to refute and/or decrease confidence in an inference may decrease such a confidence score. According to an embodiment, responsive to a high confidence score, particular aspects of discovery operation 502 may maintained. Conversely, responsive to a low confidence score, particular aspects of discovery operation 502 may be altered (e.g., to improve confidence).

In determining a confidence in an inference, according to an embodiment, a methodology determined according to operation 502j may quantify an effect of an observation of evidence (e.g., obtained according to operation 502i) according to a confidence normalizer to map such an effect on a level of confidence in an inference to a value of between −1.0 and 1.0. According to an embodiment, a methodology determined according to operation 502j may determine a level of confidence in an inference based, at least in part, on an accumulation of effects of individual observations of evidence. In an implementation, such a level of confidence may be expressed as a numerical score, such has a numerical score having a maximum value of 1.0 (e.g., wherein a numerical value of 1.0 expresses a highest level of confidence for an associated inference).

Figure 8A:
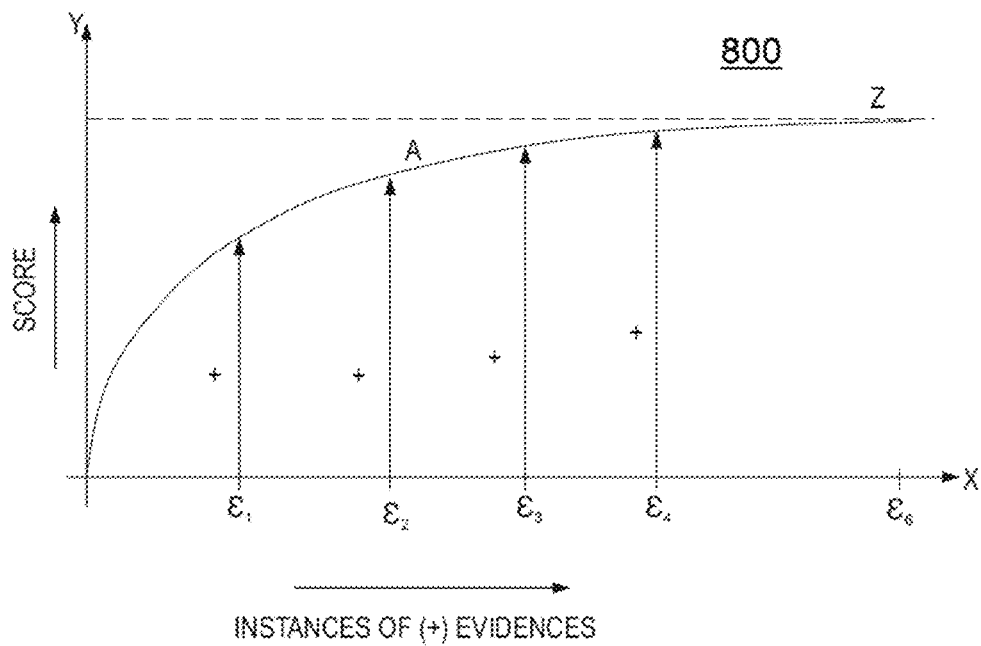
FIGS. 8A through 8E are plots illustrating a process to evaluate evidence of an inference in a system to update a signal expression of a graph according to an embodiment.
Figure 8B:
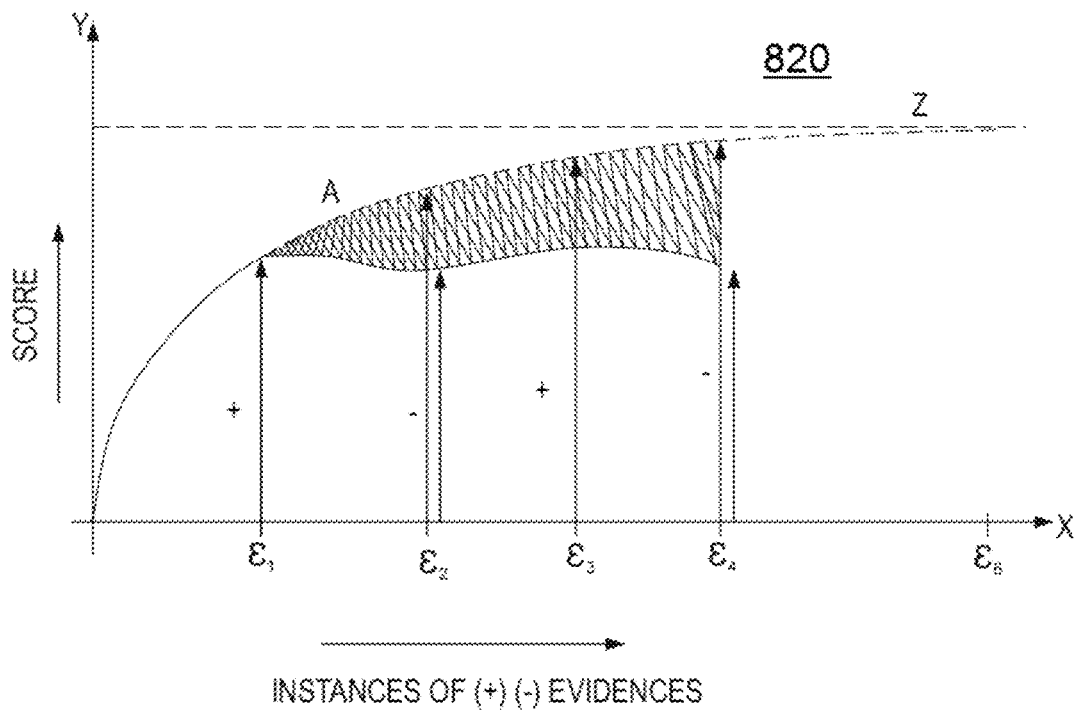
Figure 8C:
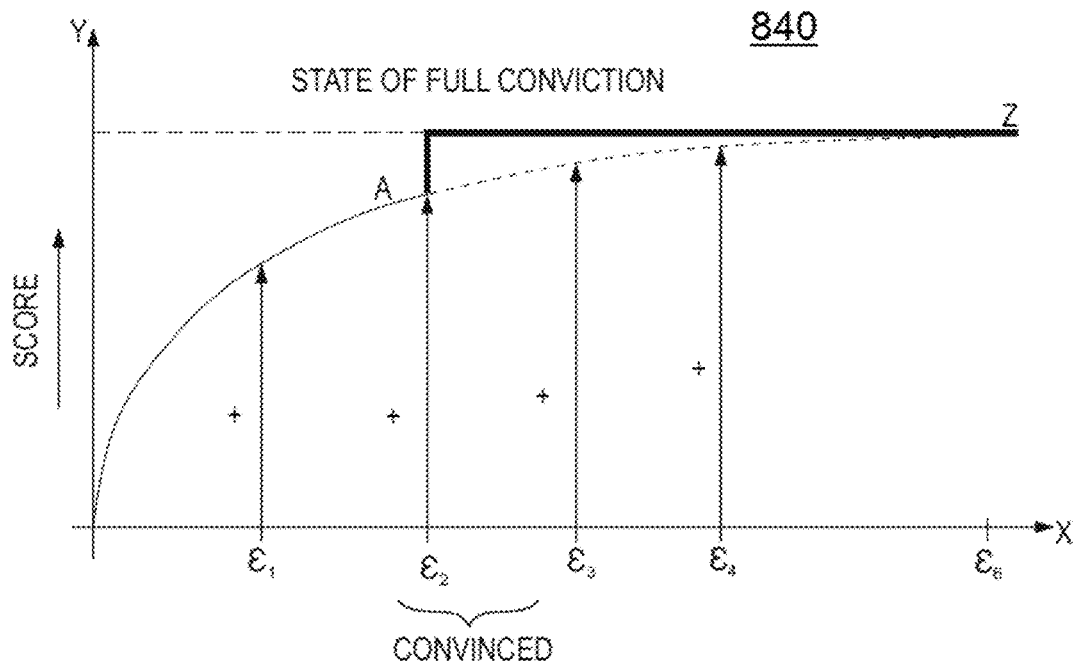
Figure 8D:
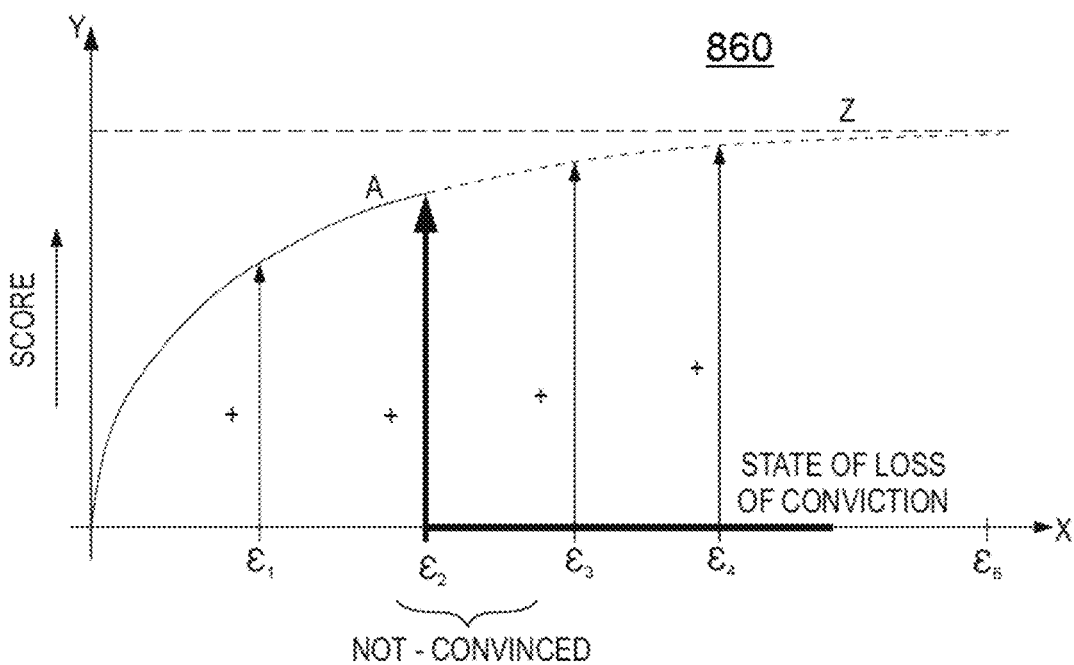

FIGS. 8A through 8E are plots illustrating a process to evaluate evidence of an inference in a system to update a signal expression of a graph according to an embodiment. In particular embodiments, plots of FIGS. 8A through 8E illustrate how a score may be computed at operation 502j to express a strength and/or confidence in an inference. As illustrated in FIG. 8A, according to an embodiment, a normalization function may be applied to series of observations of evidence ε that positively reinforce and/or "boost" confidence in an inference as reflected in a conclusive score along plot "A". As illustrated in FIG. 8B, application of such a normalization function to a mixture of observations of evidence ε that positively reinforce (e.g., "boost") and negatively reinforce (e.g., "block") confidence in an inference may be reflected in a less conclusive score along plot "B." In a process of gathering observations of evidence, according to an embodiment, a particular observation of evidence may conclusively "convince" that an associated inference is true. As shown in FIG. 8C, a normalization function applied to such a conclusively convincing (that an inference is true) observation of evidence $\varepsilon_2$ may provide confidence score of a maximum value Z. Conversely, in a process of gathering observations of evidence, a particular observation of evidence may conclusively "convince" that an associated inference is false. As shown in FIG. 8D, a normalization function applied to such a conclusively convincing (that an inference is false) observation of evidence $\varepsilon_2$ may provide confidence score of a minimum value zero.

Figure 8E:
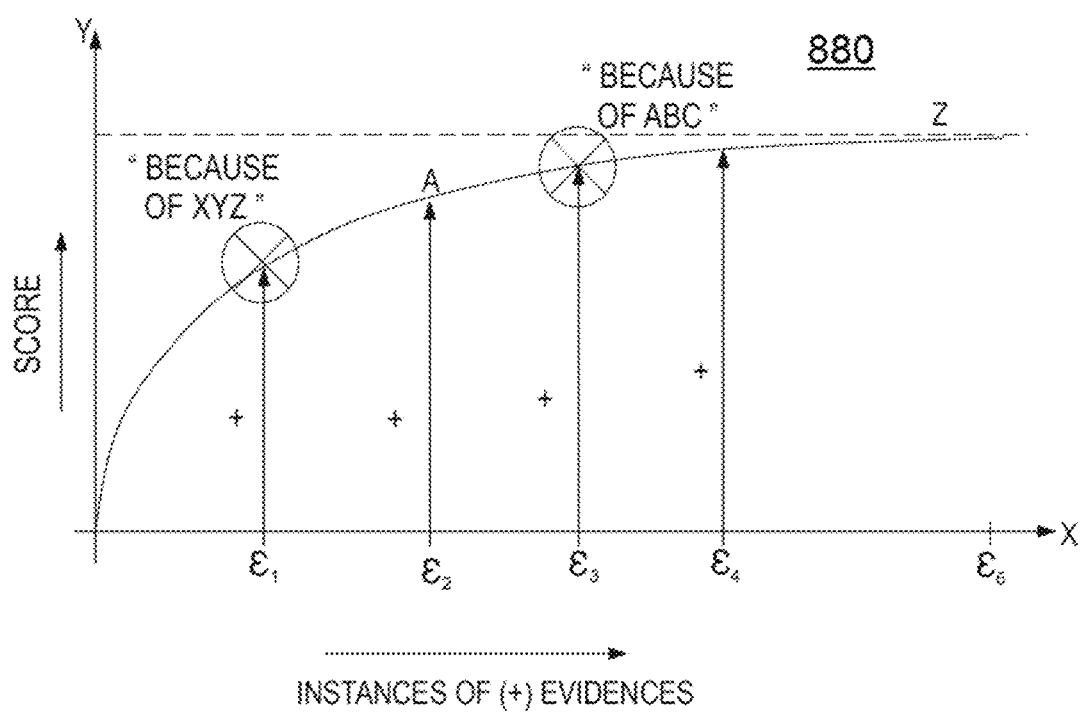

While particular implementations shown in FIGS. 8A through 8D illustrate a methodology for a normalization function to provide a single value to express confidence in an inference, other implementations of a normalization function may provided other parameters in addition to such a value to express confidence in an inference. For example, a particular implementation of a normalization function may provide a further characterization as to why and/or how particular observations of evidence may "boost" or "block" confidence in an inference. As shown in FIG. 8E, for example, observations of evidence $\varepsilon_1$ and $\varepsilon_3$ are annotated with additional parameters as to why and/or how these observations of evidence are to "boost" confidence in an inference.

Operation 504 (FIG. 5A) may, according to an embodiment, determine a methodology to preprocess collected and/or extracted knowledge (e.g., knowledge collected and/or extracted from knowledge sources 514) to be transformed. For example, operation 504 may determine methodologies to process and/or transform knowledge collected and/or extracted according to methodologies defined according to operations 502. Such transformation of collected and/or extracted knowledge may facilitate and/or enhance downstream processing such as, for example, creating and/or updating MSOs, and/or creating and/or updating edges connecting MSOs at block 512. According to an embodiment, operation 504 may comprise a sampling operation 504a and/or preprocessing operation 504b.

Operation 504a may comprise determination of a methodology of sampling of collected and/or extracted knowledge to obtain a sufficient quantity of samples and/or observations of collected and/or extracted knowledge to, for example, execute operation 512. In at least one example embodiment, a sufficient quantity of samples and/or observations may be predetermined and/or preselected. In one particular implementation, operation 504a may comprise performing a stochastic sampling in which a quantity of observations may be bound to a particular sample size. Here, such a quantity of observations may be weighted such as according to one or more probability distributions such as, for example, a Bernoulli probability distribution. In another particular implementation, a methodology determined according to operation 504a may comprise preferential sampling by application of a filter condition to constrain observations to a specific area of interest such as a specific area of business interest. In a particular example of sampling shopping basket entries for on-line purchasers, such a filter may be applied to constrain observations to records of a particular geographical area such as a certain state (e.g., California).

According to an embodiment, observations and/or samples of collected and/or extracted knowledge (e.g., observations and/or samples of collected and/or extracted knowledge obtained according to a methodology determined at operation 504a) may be obtained from heterogenous knowledge sources, and may not be in a particular format to enable convenient processing downstream. A methodology determined at operation 504b may comprise, for example, preprocessing of observations and/or samples of collected and/or extracted knowledge to, for example, enable convenient processing in a particular format (e.g., for SQL and/or spreadsheet processing). In an embodiment, a methodology determined at operation 504b may process observations and/or samples collected and/or extracted from real-world knowledge sources that are often incomplete, inconsistent, lacking in certain behaviors or trends, lacking attribute values, lacking certain attributes of interest, or containing only aggregated knowledge and/or observations. Additionally, samples and/or observations collected and/or extracted from knowledge sources may include noise originating from sources of error (e.g., measurement noise) and/or may include outliers. According to an embodiment, a methodology determined at operation 504b may preprocess samples and/or observations (e.g., samples and/or observations obtained at operation 504a) to enable and/or improve downstream processing (e.g., downstream AI and/or ML processing) that is to consume and/or process such samples and/or observations. In particular implementations, a methodology determined at operation 504b may employ one more of a plurality of techniques to preprocess samples and/or observations of knowledge collected and/or extracted from structured, unstructured and/or IoT knowledge in knowledge base 514. Techniques to preprocess such samples and/or observations may include, but not necessarily be limited to, one or more of the following processing techniques: merging; cleansing; profiling; quality assessment; spell checks and/or knowledge shaping.

According to an embodiment, different knowledge sources of knowledge sources 514 may be created and/or maintained by different entities/parties for different objectives and/or different purposes. Accordingly, different knowledge sources of knowledge sources 514 collectively organized in a disjoint and/or "siloed" fashion. Consequently, samples and/or observations obtained according to a methodology determined at operation 504a may likewise be disjoint. According to an embodiment, preprocessing samples and/or observations at operation 504b may comprise merging attributes and/or features of samples and/or observations obtained from different knowledge sources (e.g., at operation 504a) to, for example, improve utility of such samples and/or observations by downstream processes. In a business application relating to customers, for example, additional attributes and/or features of a customer may be collected if a customer profile from a first knowledge source is merged and/or combined with a customer address from a second knowledge source. This may enable generation of an MSO (e.g., according to one or more processes executed by processing system 500) that may include a customer profile merged with a customer address.

According to an embodiment, samples and/or observations obtained from a methodology determined at operation 504a may be obtained from a knowledge source in the form of a time-series values, measurements, conditions, states, parameters, documents and/or symbols, etc., such as provided by an output signal of an IoT knowledge source. Here, operation 504b may cleanse such samples and/or observations of such a time series by, for example, removing duplicates, normalizing, interpolating (e.g., to address missing values), and/or processing for validation, estimation and editing (VEE).

To better prepare samples and/or observations obtained at a methodology determined at operation 504a for downstream processing (e.g., at operation 512), a methodology determined at operation 504b may preprocess such samples and/or observations by profiling. Such profiling may comprise, for example, identifying and/or characterizing patterns in samples and/or observations to enable and/or enhance correlation analysis, regression techniques, etc. According to an embodiment, operation 504b may pre-process sampled and/or observed knowledge for additional statistical analysis by, for example, validating individual samples and/or observations of knowledge. In a particular example implementation, operation 504b may filter out and/or reject outlying and/or spurious samples and/or observations of knowledge.

According to an embodiment, a methodology determined at operation 504b may evaluate whether samples and/or observations obtained at a methodology determined at operation 504a are of sufficient quality for use in downstream processing (e.g., at operation 512). Here, for example, operation 504b may determine whether samples and/or observations are of sufficient quality to enable certain ML techniques to, for example, create and/or update MSOs in a KG.

In an embodiment, knowledge sources from which samples and/or observations are obtained at a methodology determined at operation 504a may be in the form of text in a written language and/or dialect. Samples and/or observations from some knowledge sources, such as unstructured knowledge sources, may contain text containing spelling and/or grammatical errors. According to an embodiment, operation 504b may comprise performing spelling and/or grammar checks on such written language and/or dialect text to remove and/or reduce such spelling and/or grammatical errors, for example.

According to an embodiment, samples and/or observations of knowledge obtained in a methodology determined at operation 504a may comprise samples and/or observations of attributes and/or features that are not sorted or otherwise organized according to particular characteristics. According to an embodiment, operation 504b may perform one or more aspects of shaping unsorted and/or disorganized samples and/or observations by, for example, creating attribute classifications and sorting such disorganized samples and/or observations according to such attributed classifications.

According to an embodiment, operation 506 may determine an approach and/or strategy for acquiring processable knowledge to, for example, create and/or update MSOs in a KG. In a particular implementation, operation 506 may determine such an approach and/or strategy based, at least in part, on one or more factors such as, for example, cost, available parallelization, scalability, containerization and/or cloud readiness of processable knowledge, just to provide a few examples. In determining an approach and/or strategy for acquiring processable knowledge, operation 506 may employ statistical techniques such as, for example, an evaluation of attributes, relationships and/or associations between/among MSOs, cardinality of events, a cardinal distribution of items of processable knowledge available in internal and external knowledge sources, just to provide a few examples. In determining an approach and/or strategy for acquiring processable knowledge, operation 506 may employ linguistic analysis such as, for example, determining an everyday representation of a real-world object in a natural language including identifying descriptive synonyms, acronyms, antonyms and/or adjectives, determining how terms may be disambiguated, determining whether terms are in a table of contents, sentence, an expression of currency, etc. Such linguistic processing may employ, for example, hierarchical text parsing including like dependency and/or constituency parsing. In an embodiment, operation 506 may employ any one of several text processing techniques such as, for example, use of word vectors (e.g., in combination with one or more specific vectorization strategies), n_grams or default analyzers, just to provide a few examples of text processing techniques that may be used. In addition to evaluating statistics and linguistic features of samples and/or observations of knowledge, operation 506 may also evaluate behavior of people and/or objects to determine an approach and/or strategy for acquiring processable knowledge features. In a specific example for the purpose of illustration, operation 506 may evaluate behavioral aspects of individuals that interact with and/or relate in a business-relevant manner to one or more specific commercial products. Such behavioral aspects may include, for example, a vendor party interacting with and/or relating to a product in one aspect, a supplier party interacting with and/or relating to the product in another aspect, and a customer party interacting to with and/or relating to the product in multiple aspects. A manager and operational personnel of a business enterprise, for example, may interact with and/or relate to a particular product differently. As such, in a particular implementation, an application layer (e.g., application layer 102, FIG. 1) may respond differently (e.g., presented differently) based, at least in part, on attributes of an individual (e.g., attributes of a venter, supplier, customer, manager, operational personnel, etc.) accessing the application layer and different related MSOs and/or associated ontologies and/or KGs. Such response and/or behavior of an application may be affected, for example, on how such MSOs and/or associated ontologies and/or KGs are curated in processing system 500.

In an embodiment, an expression of knowledge may be characterized at operation 506, at least in part, by statistics indicating, for example, how a particular arrangement of such an expression of knowledge may be of value and/or utility in the future. For example, such statistics may indicate whether a certain expression of knowledge is most effectively arranged in a table form or a paragraph form. Such statistics characterizing an expression of knowledge may suggest how attributes in the expression of knowledge may be most effectively defined, and how relationships and associations among different MSO's may be most effectively defined. For example, such statistics characterizing an expression of knowledge may suggest how different MSO's may be connected (e.g., by edges in a KG) to enable delivery of in-depth information from a KG responsive to a query. Such statistics characterizing an expression of knowledge may indicate, for example, a cardinality of events, row counts and/or a cardinal distribution of information within internal and external knowledge landscapes.

At operation 508, processed and acquired knowledge may be enriched using a plurality of predefined functions selected based, at least in part, on a type of knowledge that is processed and acquired. Operation 508 may comprise training an MSO generation/update platform (e.g., processing system 500) to improve understanding, interpretation and/or curation of acquired and/or processed knowledge based, at least in part, on common sense and/or heuristic-based principles. In one example, operation 508 may recognize that a long portion of text in a particular data field is made up of several words imparting a particular meaning (e.g., forming a complete sentence), and therefore infer that the particular data field is a descriptive data field. Similarly, operation 508 may predict that a time series of values maintaining between upper and lower bounds would stay within such upper and lower bounds in the future. These and other techniques of introspection may enable automatic improvement in baseline extracted knowledge and/or meta data (e.g., to be expressed in an MSO container). In an embodiment, enrichment at operation 508 may be performed concurrently and/or in combination with aspects of operations 502, operations 504 and/or operation 506. Enrichment at operation 508 may employ user feedback (e.g., likes or dislikes) and reinforce learning techniques to train system 500 to create more effective MSOs. In an implementation, enrichment at operation 508 may facilitate knowledge labelling with single or multiple tags. For example, AI methods such as weak supervision may be used to label newly created MSOs that are added to a KG. According to an embodiment, enrichment at block 508 may be implemented with a group of predefined functions which are selectively applied to tailor to a particular knowledge type and/or desired outcome at relevant stages in a process to create and/or update an MSO. Such functions may include, for example, continuous functions, discrete functions, identification of records, spatial functions, linguistic enhancement, identification of document types, identification of grid types, dimensional analysis, variable types, charting and mapping options. In one embodiment, enrichment at operation 508 may be rule based. In another embodiment, enrichment at operation 508 may be machine learning based. In yet another embodiment, user feedback may also be used to train system 500 to create more effective MSO's using reinforcement learning methods.

According to an embodiment, a business and/or enterprise may maintain and/or exploit institutional knowledge in the course of executing operations in support of a mission and/or objective. In an embodiment, a business and/or enterprise may maintain and/or update such institutional knowledge using formal processes to gather, document and/or disseminate such institutional knowledge. Such institutional knowledge may be derived, at least in part, as a combination of experiences, processes, observations, expertise, values and/or knowledge possessed by company employees. A business and/or enterprise may accumulate institutional knowledge derived from trends, projects, experiences and/or perspectives over a span of years and/or decades. Institutional knowledge may be maintained in a form of a documents and/or other tangible expression of knowledge and may be obtained from knowledge sources 514 as described above.

In addition to employing institutional knowledge, employees of a business and/or enterprise may employ "tribal knowledge" in the course of executing operations in support of a mission and/or objective. In this context, the term "tribal knowledge" is to mean knowledge possessed by one or more individuals of a business, enterprise and/or organization that has not been formally incorporated as institutional knowledge for the business, enterprise and/or organization. Such tribal knowledge may comprise, for example, knowledge that is not maintained, documented and/or disseminated according to formal organizational processes. For example, tribal knowledge may be maintained in the "heads" of company employees and/or in personal notes, and/or disseminated between and/or among company employees/workers informally by word of mouth and/or by non-verbal communication. While tribal knowledge may be retained not according to any formal processes, tribal knowledge may nevertheless enable insights, predictions and/or recommendations of value to a business and/or enterprise.

Particular embodiments described herein are directed to application of tribal knowledge in creation and/or maintenance of MSOs in a KG. At operation 510, for example, tribal knowledge may be captured and/or acquired for use in creating MSOs and defining edges connecting MSOs in a KG. In some example embodiments, captured and/or acquired tribal knowledge may be incorporated in creating/updating tags of an MSO (e.g., at operation 502g), label parameters/expressions, and use in boosting or blocking associated inferences (e.g., in operations 502i and/or 502j). Tribal knowledge may also be used to manually create edges among MSOs in a KG. Referring to the particular KG in FIG. 3A, for example, "customer" MSO 302 may be connected to "payment" MSO 308 as customer "pays" the "payment" according to institutional knowledge. Here, "customer pays bills" (e.g., an additional connection of "customer" MSO 302 to "bill" MSO 318) may be an expression of tribal knowledge that is not a part of institutional knowledge.

Figure 5D:

At operation 512, an MSO may be created and/or updated based, at least in part, on knowledge acquired from knowledge sources 514 and/or acquired tribal knowledge. FIGS. 5C and 5D illustrate examples of representations of an MSO in a data structure according to alternative embodiments. As may be observed, FIGS. 5C and 5D express edge relationships with other MSOs in respective KGs and containers including metadata. As shown in the particular illustrated example, features of an MSO may be expressed in a data structure formatted as JSON objects. It should be understood, however, that different types of formats may be used. Data structures 560 and 570 may be structured hierarchically, and define attributes determined according to one or more aspects of processing system 500 (FIG. 5A). For example, data sourcing features 562 and 572 may be determined according to operation 502c. Relationships 564 and 576 may define relationships between MSO represented by data structures 560 and 570 and other MSOs. FIG. 5C shows an example implementation of features of an MSO in a KG and/or ontology to represent and/or express an employee in an enterprise according to an embodiment. Features 566 may specify employee number, name, department, age, hire date, etc. FIG. 5D shows an example implementation of features of an MSO in a KG and/or ontology to represent and/or express a contract, according to an embodiment. Feature 573 may specify a knowledge storage type such as "hot," "warm," "cold" or "search" (e.g., maintained in a corresponding particular one of databases 108, 110, 112 or 120) (shown here as "warm"). Feature 574 may permit customized user-defined tags or automatically generated tags (e.g., a single tag or multiple tags) (e.g., as described in operation 502g), which may act as identifiers in the processing of a query. Feature 577 may permit specifying attributes of a particular contract such as start date, end date, term, clauses, etc.

Figure 6:
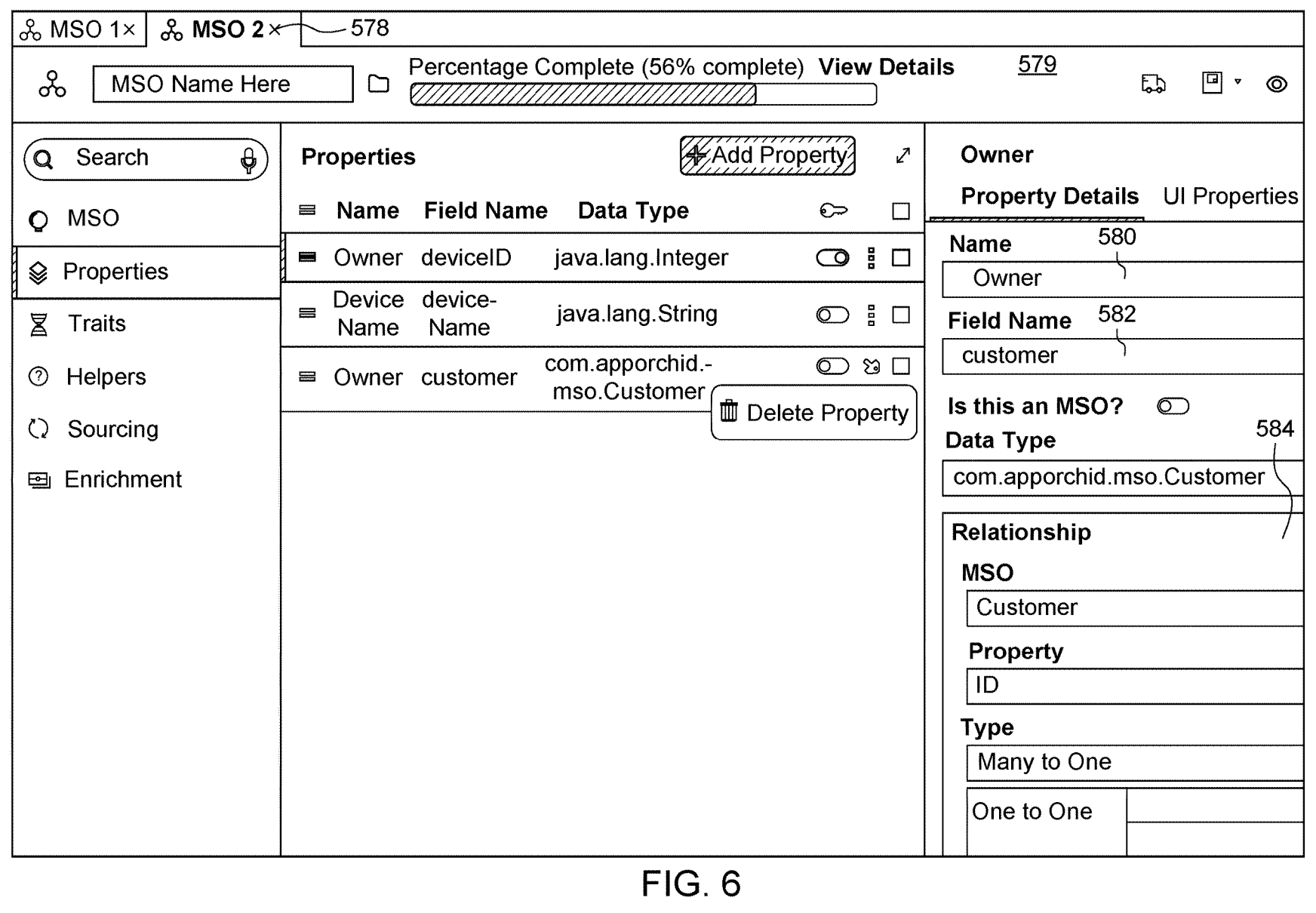

As pointed out above, aspects of a KG and/or ontology (such as MSOs and edges connecting MSOs to represent relationships between and/or among real-world objects) may be manually created by an operator/user. FIG. 6 shows features of a graphical user interface (GUI) that may enable an operator/user to manually create and/or modify MSOs in a KG and/or ontology. Upon selection of a particular MSO at tab 578, an operator and/or user may specify relationships with other MSOs at fields 584, a party to be designated as an "owner," among other properties.

Figure 7:
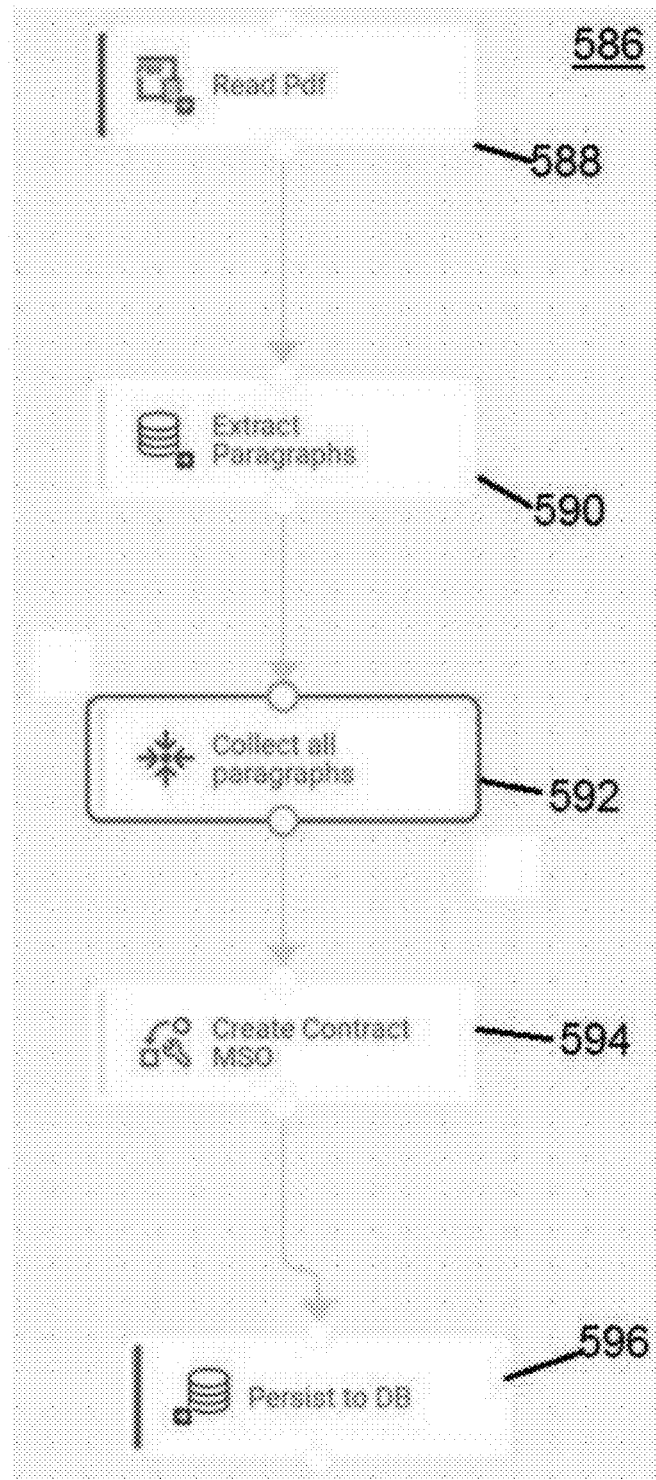
FIG. 7 is a flow diagram of a pipeline process to extract knowledge from a source according to an embodiment.

As pointed out above, an MSO in a KG and/or ontology may be created responsive to an event, such as receipt of a natural language query that may not be completely answerable from MSOs currently in the KG and/or ontology. FIG. 7 is a flow diagram of a process 586 to create an MSO in a KG and/or ontology using, for example, one or more aspects of processing system 500 discussed above. Block 588 may comprise access of one or more items of knowledge such as, for example, one or more documents in a particular format (e.g., Adobe® PDF). Blocks 590 and 592 may be performed according to one or more aspects of operations 502, 504 and/or 506, for example (FIG. 5A). In a particular implementation, blocks 588, 590 and 592 may be performed in a sequential pipeline until sufficient knowledge is processed/connected to create an MSO at block 594. An MSO created at block 594 may then be integrated with other persistent features of one or more KGs and/or ontologies at block 596.

Figure 9A:
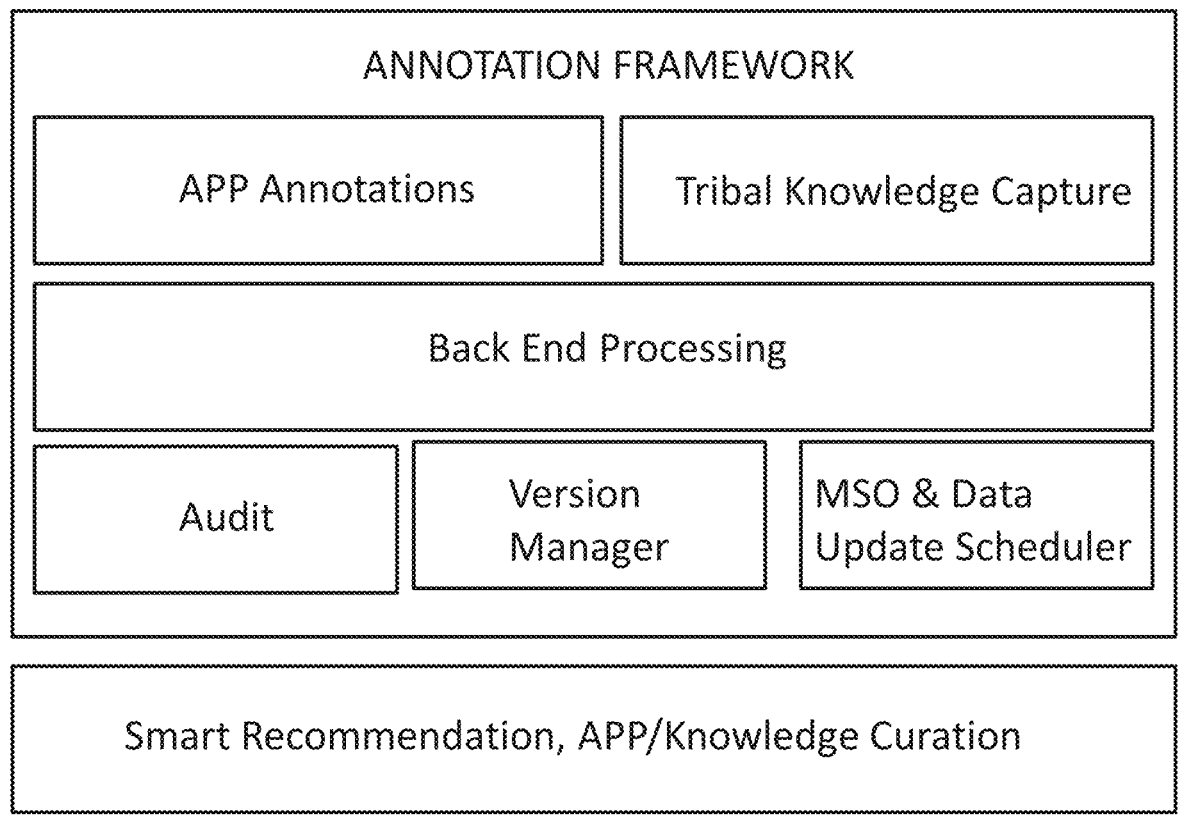
FIG. 9A is a schematic diagram of a system to annotate MSOs in a signal expression of a graph according to an embodiment.

FIG. 9A is a schematic diagram of a system to annotate MSOs in a signal expression of a graph using acquired tribal knowledge according to an embodiment. The system of FIG. 9A may provide a particular framework to capture tribal knowledge that may be incorporated into features of an MSO in an update of attributes of the MSO and/or an update of attributes of a specific item of knowledge relating to the MSO (e.g., an item of knowledge that is pointed to and/or referenced by the MSO) This may enable multiple advantages in addition to the curation of labelled knowledge. For example, processes in processing system 500 (FIG. 5A) may process annotations capturing tribal knowledge through various analyzers/pipelines to update processing pipelines and/or ML/AI models associated with particular MSOs. Thus, the next time such an MSO is triggered (e.g., in the course of accessing items of knowledge referenced by a KG and/or ontology containing the MSO), updated processes may come into play. In an embodiment, an MSO that may be curated in this fashion may provide a self-contained tuning parameter, thereby possibly removing and/or reducing any necessity of retraining entire models if a new MSO is introduced to a KG and/or ontology, or if a new knowledge domain is introduced. As described below, user annotations may also be used to curate a knowledge graph and related applications, such as to highlight an important insight/summary. According to an embodiment, the system of FIG. 9A may enable a framework capture tribal knowledge as annotations of items of knowledge (e.g., obtained from knowledge sources 514) in the course of creating and/or updating MSOs for a KG and/or ontology. Here, particular applications App Annotations may be deployed on one or more computing devices (e.g., employing one or more graphical user interfaces (GUIs)) to enable an operator/user (e.g., expert and/or person with tribal knowledge) associate tribal knowledge with aspects of obtained knowledge items. Back end processing at one or more computing devices may incorporate captured tribal knowledge in the process creating and/or updating MSOs. As an annotation framework updates an MSO, certain sanity checks may be implemented so that updates provide meaningful additions and do not disrupt working MSO's and/or affected models. A Version Manager may keep track of updates to particular MSOs so that if the updates produce undesirable results, a previous version may be restored for better results for a particular customer. As multiple operators/users may annotate and/or add tribal knowledge, the updates to an MSO and related items of knowledge may be done following completion of audit checks based on a schedule, for example.

According to an embodiment, audit checks may also constrain certain MSO updates that are not beneficial and/or violate a policy. In a particular implementation, annotations of tribal knowledge may be tracked according to individuals making such annotations and/or times that such annotations were made, for example. Changes to MSOs from capture of tribal knowledge from time to time may be managed by a version manager, and a mechanism to schedule incorporation of tribal knowledge in an existing KG and/or ontology.

Figure 9B:
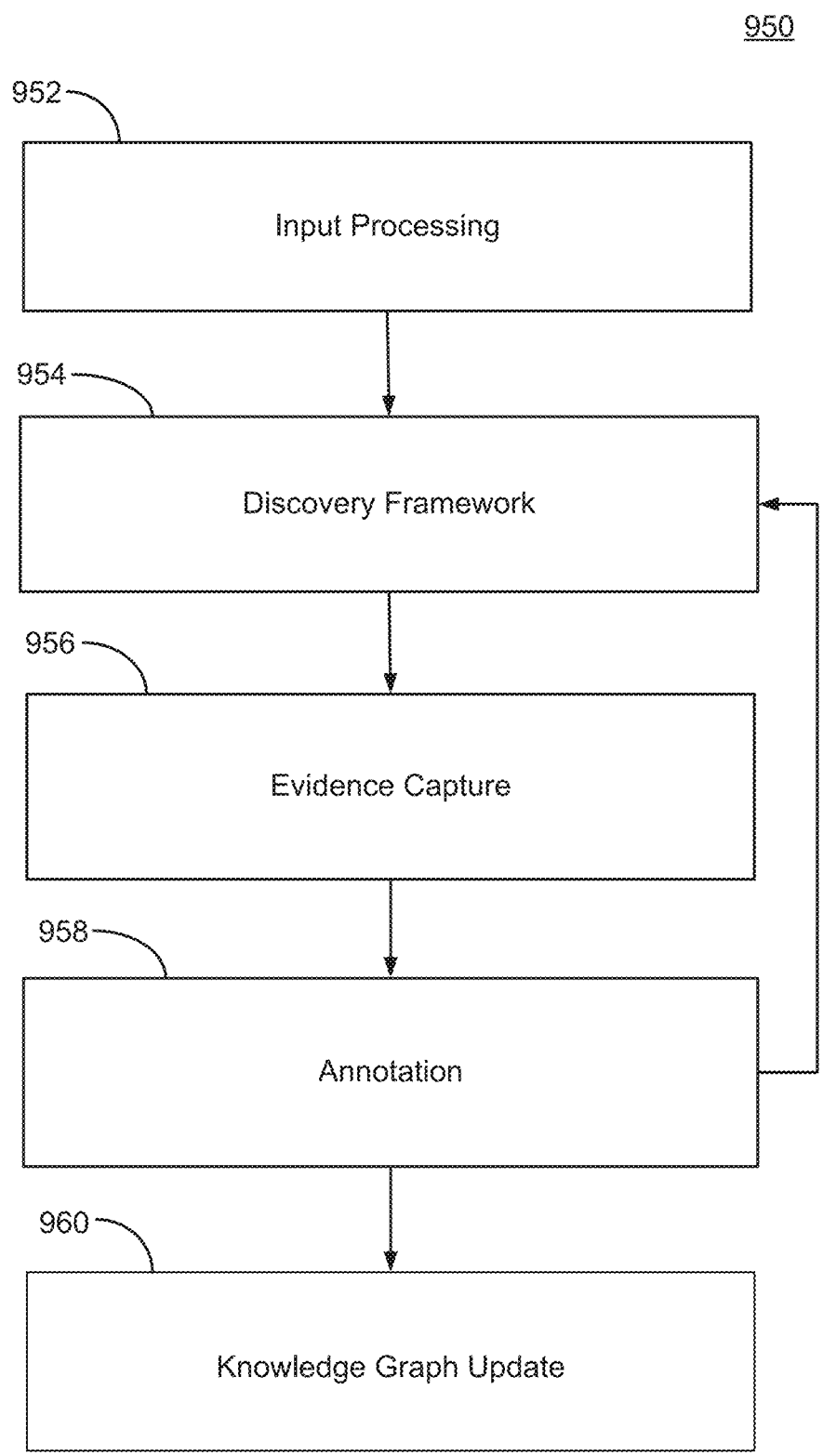
FIG. 9B is a flow diagram of a process to incorporate annotations to update a knowledge graph and/or MSO according to an embodiment.

FIG. 9B is a flow diagram of a process 950 for capturing tribal knowledge such as in a framework shown in FIG. 9A. An operator (e.g., expert and/or person with tribal knowledge) may, for example, associate tribal knowledge with aspects of obtained knowledge items at block 952 using a GUI, for example. As pointed out above, a process of incorporating tribal knowledge may be integrated into one or more operations of processing system 500 such as operation 502 (FIG. 5A). For example, block 954 may be integrated with and/or affect one or more aspects of processing at operations 502b and 502h. Similarly, block 958 may be integrated with and/or affect one or more aspects of operations 502i and/or 502j to, for example, incorporate tribal knowledge as observations of evidence affecting confidence in one or more inferences. Annotations to MSOs based, at least in part, on captured tribal knowledge may be determined at block 958. Such annotations determined at block 958 may further provide inputs to tune and/or direct processes at block 954. Block 960 may also update MSOs and/or KGs based, at least in part, on annotations determined at block 958 (e.g., under control of Version Manager shown in FIG. 9A).

Figure 9C:
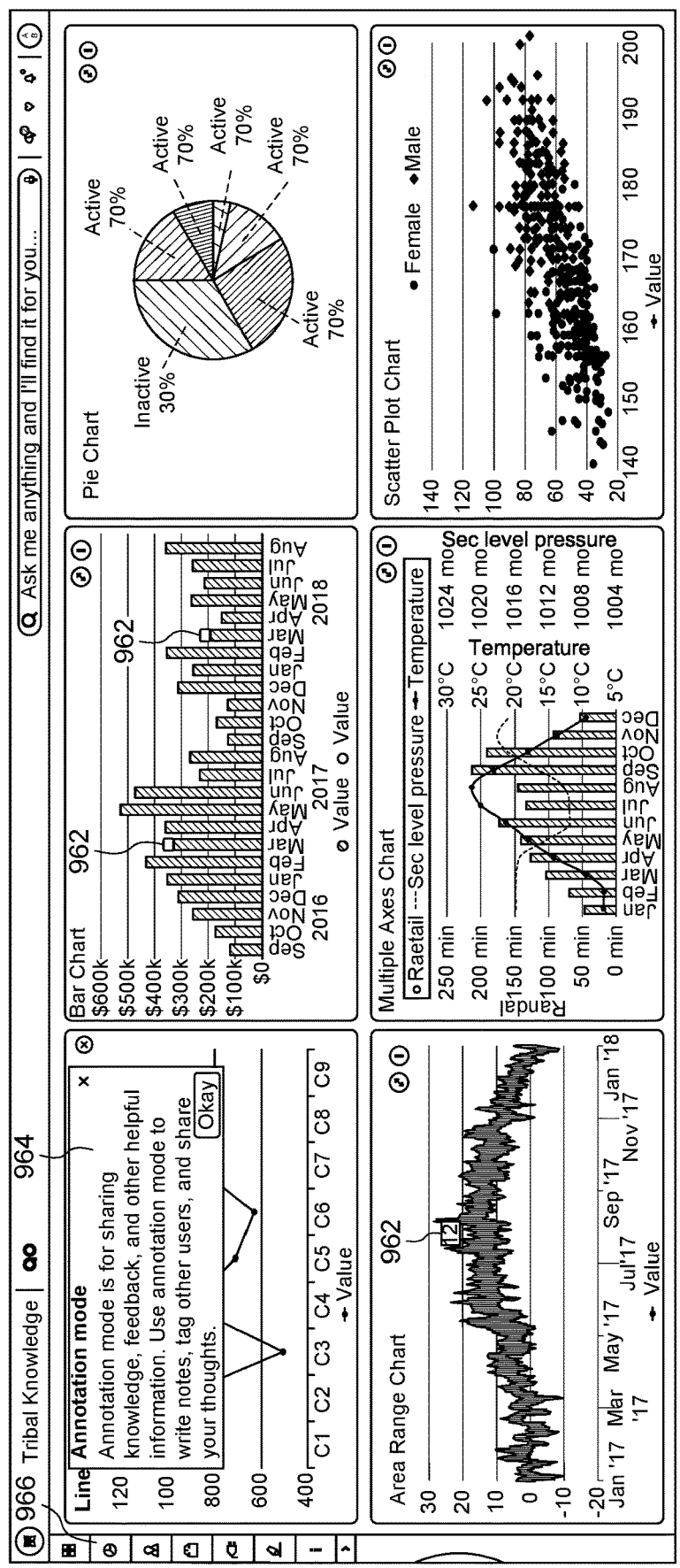

According to an embodiment, input processing at block 952 may be implemented in part with a set of application program interfaces (APIs) that may be called by the Apps that send the annotation back to the server. Such APIs may be wrapped in java script functions to facilitate integration of a server. Such APIs may support tailored annotation capture GUIs which can be used by cue-cards or custom microapps, for example. In a particular implementation, such an API may facilitate creation, reading, updating and deleting annotations, for example. According to an embodiment, annotations may be maintained as JSON objects comprising fields to express attributes such as, for example, a date of annotation capture, a solution identifier, application identifier, microapplication identifier, a pipeline identifier, any criteria applied for filtering extracted knowledge, an MSO structure, a screen capture of a component receiving an annotation, identifier, just to provide a few examples. According to an embodiment, specialized microapplications, may be used to capture associated types of annotations and associated observations of knowledge. Such a specialized microapplication may store different annotation types and associated observations. In particular implementations, a microapplication may facilitate specific techniques to receive annotations to specific types of knowledge in a format that is native to the microapplication while providing received annotations formatted to conform to an overall annotation framework (e.g., as shown in FIG. 9A). According to an embodiment, a microapplication may define how a user/operator is to select aspects of an item of knowledge for annotation. How a user is to select aspects of an item of knowledge for annotation (e.g., in a GUI) may be customized for particular types or formats of items of knowledge to be annotated. For example, a feature of a map item may be selected by drawing a polygon, circle or other shape to enclose the feature while a feature on a bar chart item may be selected by clicking on particular bars of interest. Here, a microapplication may store X and Y axis ranges denoted by shapes as well as points within a shape. Of course these are merely examples of how a microapplication may enable a user/operator to select an aspect of an item of interest to be annotated, and claimed subject matter is not limited in this respect. FIG. 9C is a diagram depicting visual representations of items of knowledge that may be annotated to capture tribal knowledge in a GUI according to an embodiment of block 952, for example. As shown in FIG. 9C, knowledge may be visually depicted in any one of several formats such as, for example, a pie graph, scatter plot, bar graphs, piece-wise linear plots. In an example implementation, a user/operator may, through a GUI, apply annotations to specific features of such visual depictions. An application may include an annotate button 966 in a menu. In a particular implementation, a set of predefined tags enable convenient selection for a user/operator. Once annotate button 966 is selected the application may shift to an annotation mode providing a set of tools or means to select aspects of visual representations of knowledge. Once a particular portion an item of knowledge is selected, an annotation window 964 may open to receive tribal knowledge to be captured in any one of several suitable formats.

Figure 9D:
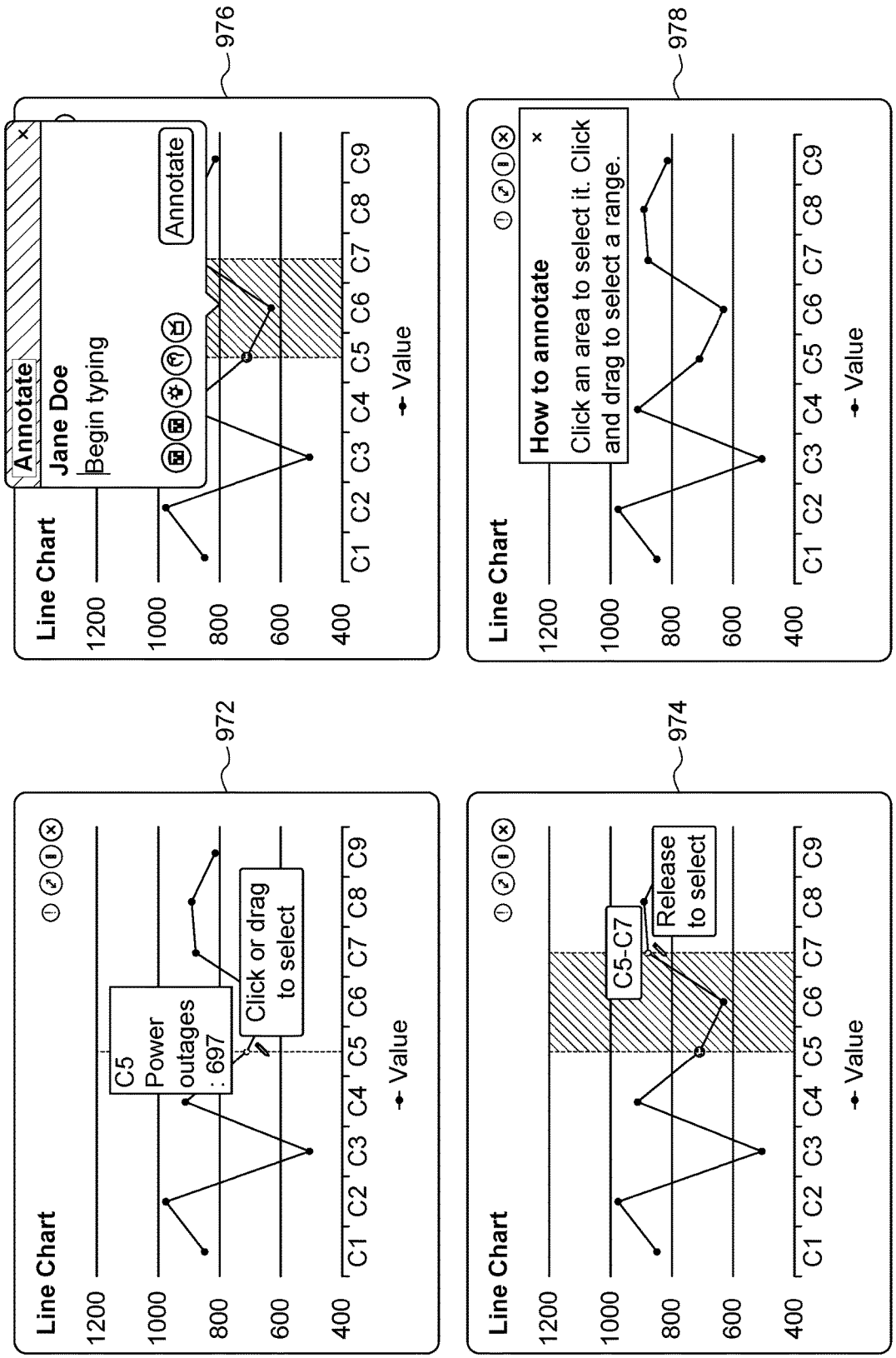
Figure 9F:
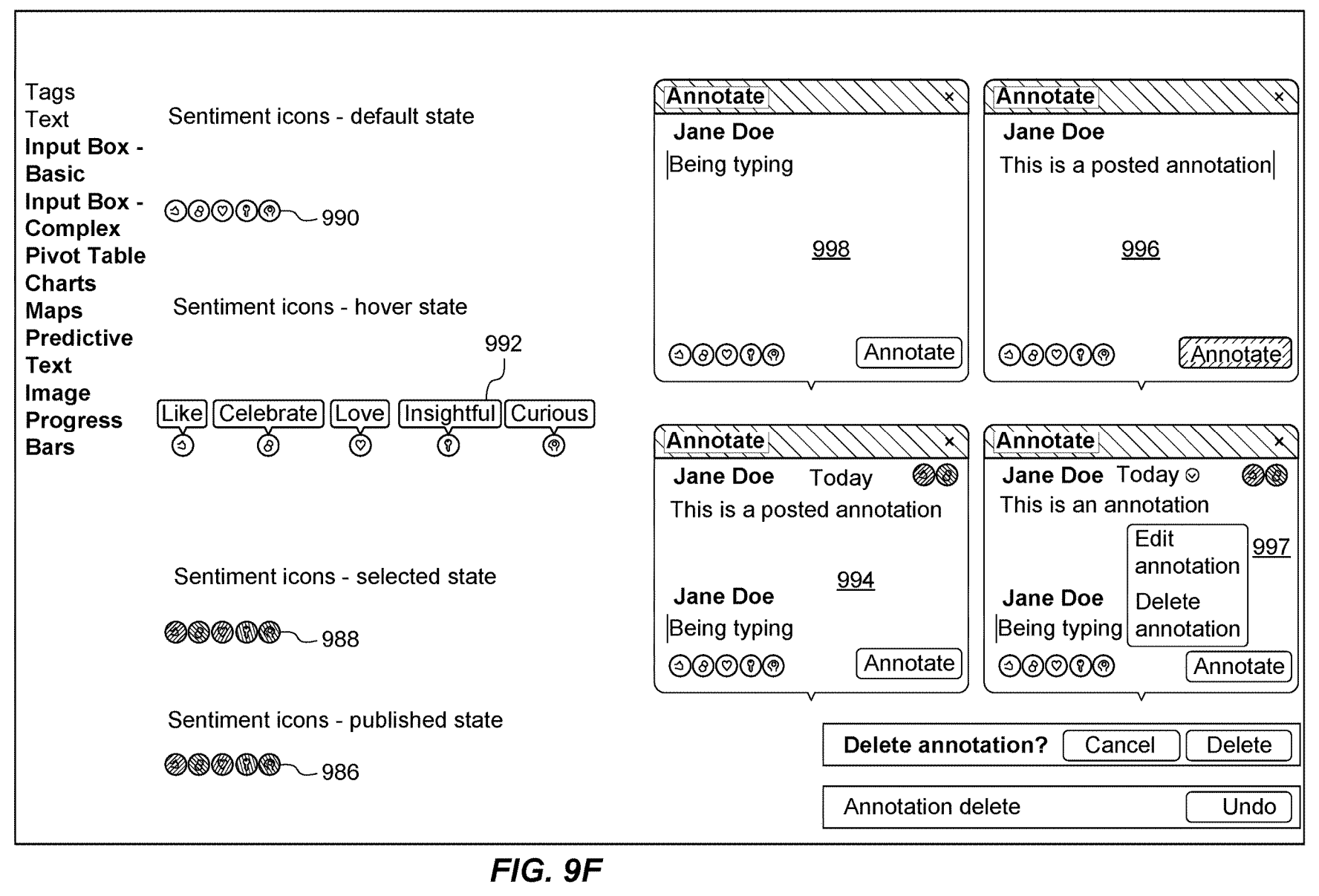
Figure 9E:
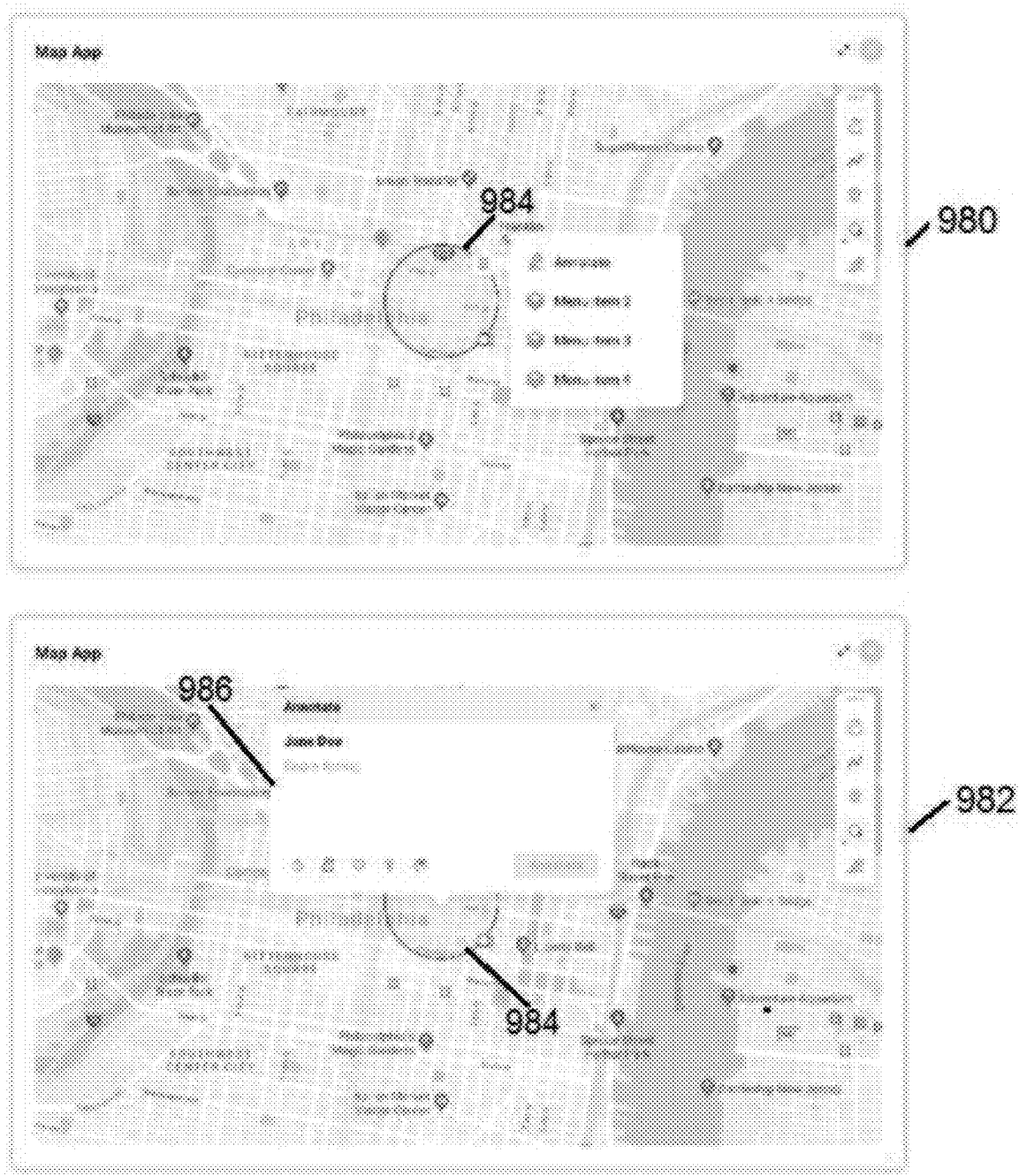

Such annotations may comprise, for example, providing text to a tag and/or label to specific features (e.g., at specific relevant portions of a graph or plot at labels 962). Such annotations may provide, for example, additional qualifiers and/or explanation to be attached to such specific features. In the particular illustrative example of FIG. 9D, particular relevant portions of a piece-wise linear plot may be annotated. At views 972 and 974, a pointer device (not shown) in a GUI used to click on and drag from a value C5 to C7 to select a range of interest on the piece-wise linear plot from C5 to C7. View 976 shows a prompt to enable receipt of a text annotation to be associated with the selected range of interest on the piece-wise linear plot. In another example shown in FIG. 9E, relevant a portion of a map may be annotated. At view 980, a portion of interest on a map (e.g., specific neighborhood or city blocks) may be selected. For example, view 980 shows placement of a circle (e.g., by interaction of a pointer device with a GUI) to select a region of interest to be within the circle (such as by clicking at the center of the circle and dragging outward to define the radius of the circle to enclose the portion of interest). View 982 shows a prompt to enable receipt of a text annotation to be associated with the selected region enclosed by the circle drawn in the map. In another embodiment, a pointer device may be used (e.g., via a series of clicks and drags) to specify polygonal shapes instead of circles.

FIG. 9F shows different features of a GUI that may be used to capture annotations to an attribute of a portion of an item of knowledge according to an embodiment. Such a portion of an item of knowledge may be selected by an operator/user using techniques illustrated in FIGS. 9C, 9D and 9E, for example. Features 994, 996, 997 and 998 may facilitate capturing annotations (e.g., to be applied to particular selected portions of items of knowledge) in a text format. Feature 996 shows that text is currently being entered for an annotation. Feature 994 shows a complete capture of a text-based annotation. Feature 997 shows illustrates a process of editing or deleting a text-based annotation. In addition to and/or in lieu of capture of text-based annotations, non text-based annotations may be captured at features 990 or 992. For example, features 990 and 992 may be used, for example, to capture a sentiment to be associated with a portion of a selected portion of knowledge (e.g., "like", "love", "celebrate", "insightful" or "curious"). It should be understood that the particular examples in FIGS. 9C, 9D, 9E and 9F show merely examples (e.g., providing text, selection of emojis) of how annotations from a user/operator may be received by a microapplication, and that a microapplication may receive annotations at block 952 (FIG. 9A) in different formats without deviating from claimed subject matter. For example, a microapplication may receive uploaded objects such as images, audio clips and/or video clips, just to provide a few alternative examples of formats in which annotations may be provided.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

A "signal measurement" and/or a "signal measurement vector" may be referred to respectively as a "random measurement" and/or a "random vector," such that the term "random" may be understood in context with respect to the fields of probability, random variables and/or stochastic processes. A random vector may be generated by having measurement signal components comprising one or more random variables. Random variables may comprise signal value measurements, which may, for example, be specified in a space of outcomes. Thus, in some contexts, a probability (e.g., likelihood) may be assigned to outcomes, as often may be used in connection with approaches employing probability and/or statistics. In other contexts, a random variable may be substantially in accordance with a measurement comprising a deterministic measurement value or, perhaps, an average measurement component plus random variation about a measurement average. The terms "measurement vector," "random vector," and/or "vector" are used throughout this document interchangeably. In an embodiment, a random vector, or portion thereof, comprising one or more measurement vectors may uniquely be associated with a distribution of scalar numerical values, such as random scalar numerical values (e.g., signal values and/or signal sample values), for example. Thus, it is understood, of course, that a distribution of scalar numerical values, for example, without loss of generality, substantially in accordance with the foregoing description and/or later description, is related to physical measurements, and is likewise understood to exist as physical signals and/or physical signal samples.

The terms "correspond", "reference", "associate", and/or similar terms relate to signals, signal samples and/or states, e.g., components of a signal measurement vector, which may be stored in memory and/or employed with operations to generate results, depending, at least in part, on the above-mentioned, signal samples and/or signal sample states. For example, a signal sample measurement vector may be stored in a memory location and further referenced wherein such a reference may be embodied and/or described as a stored relationship. A stored relationship may be employed by associating (e.g., relating) one or more memory addresses to one or more another memory addresses, for example, and may facilitate an operation, involving, at least in part, a combination of signal samples and/or states stored in memory, such as for processing by a processor and/or similar device, for example. Thus, in a particular context, "associating," "referencing," and/or "corresponding" may, for example, refer to an executable process of accessing memory contents of two or more memory locations, e.g., to facilitate execution of one or more operations among signal samples and/or states, wherein one or more results of the one or more operations may likewise be employed for additional processing, such as in other operations, or may be stored in the same or other memory locations, as may, for example, be directed by executable instructions. Furthermore, terms "fetching" and "reading" or "storing" and "writing" are to be understood as interchangeable terms for the respective operations, e.g., a result may be fetched (or read) from a memory location; likewise, a result may be stored in (or written to) a memory location.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present patent application, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, MD, 21050-2747), but may include other aspects, such as the Hadoop distributed file system (HDFS) (available from the Apache Software Foundation, 1901 Munsey Drive, Forrest Hill, MD, 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present patent application, use of the term "Hadoop" is intended to include versions, presently known and/or to be later developed.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 10:
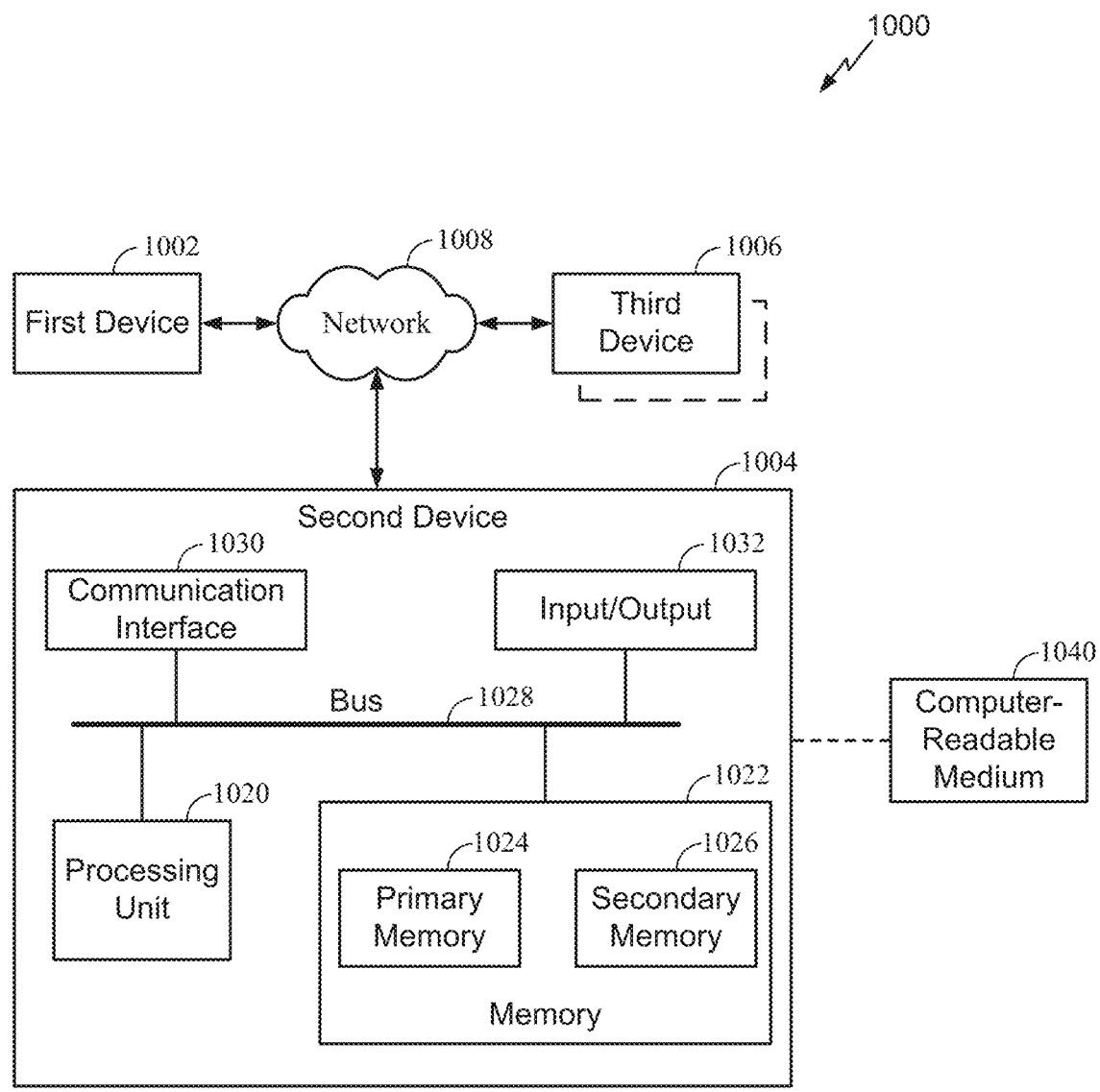
FIG. 10 is a schematic block diagram of an example computing system in accordance with an implementation.

In one example embodiment, as shown in FIG. 10, a system embodiment may comprise a local network (e.g., device 1004 and medium 1040) and/or another type of network, such as a computing and/or communications network. For purposes of illustration, therefore, FIG. 10 shows an embodiment 1000 of a system that may be employed to implement either type or both types of networks. Network 1008 may comprise one or more network connections, links, processes, services, applications, and/or resources to facilitate and/or support communications, such as an exchange of communication signals, for example, between a computing device, such as 1002, and another computing device, such as 1006, which may, for example, comprise one or more client computing devices and/or one or more server computing device. By way of example, but not limitation, network 1008 may comprise wireless and/or wired communication links, telephone and/or telecommunications systems, Wi-Fi networks, WiMAX networks, the Internet, a local area network (LAN), a wide area network (WAN), or any combinations thereof.

Example devices in FIG. 10 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor," for example, is understood to connote a specific structure such as a central processing unit (CPU) of a computing device which may include a control unit and an execution unit. In an aspect, a processor may comprise a device that fetches, interprets and executes instructions to process input signals to provide output signals. As such, in the context of the present patent application at least, computing device and/or processor are understood to refer to sufficient structure within the meaning of 35 USC § 112 (f) so that it is specifically intended that 35 USC § 112 (f) not be implicated by use of the term "computing device" "processor" and/or similar terms; however, if it is determined, for some reason not immediately apparent, that the foregoing understanding cannot stand and that 35 USC § 112 (f), therefore, necessarily is implicated by the use of the term "computing device," "processor" and/or similar terms, then, it is intended, pursuant to that statutory section, that corresponding structure, material and/or acts for performing one or more functions be understood and be interpreted to be described at least in FIGS. 1-9F and in the text associated with the foregoing figure(s) of the present patent application.

Referring now to FIG. 10, in an embodiment, first and third devices 1002 and 1006 may be capable of rendering a graphical user interface (GUI) (e.g., including a pointer device) for a network device and/or a computing device, for example, so that a user-operator may engage in system use. Device 1004 may potentially serve a similar function in this illustration. Likewise, in FIG. 10, computing device 1002 ('first device' in figure) may interface with computing device 1004 ('second device' in figure), which may, for example, also comprise features of a client computing device and/or a server computing device, in an embodiment. Processor (e.g., processing device) 1020 and memory 1022, which may comprise primary memory 1024 and secondary memory 1026, may communicate by way of a communication bus 1015, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 1004, as depicted in FIG. 10, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 10, computing device 1002 may provide one or more sources of executable computer instructions in the form physical states and/or signals (e.g., stored in memory states), for example. Computing device 1002 may communicate with computing device 1004 by way of a network connection, such as via network 1008, for example. As previously mentioned, a connection, while physical, may not necessarily be tangible. Although computing device 1004 of FIG. 10 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1022 may comprise any non-transitory storage mechanism. Memory 1022 may comprise, for example, primary memory 1024 and secondary memory 1026, additional memory circuits, mechanisms, or combinations thereof may be used. Memory 1022 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1022 may be utilized to store a program of executable computer instructions. For example, processor 1020 may fetch executable instructions from memory and proceed to interpret and execute the fetched instructions. Memory 1022 may also comprise a memory controller for accessing device readable-medium 1040 that may carry and/or make accessible digital content, which may include code, and/or instructions, for example, executable by processor 1020 and/or some other device, such as a controller, as one example, capable of executing computer instructions, for example. Under direction of processor 1020, a non-transitory memory, such as memory cells storing physical states (e.g., memory states), comprising, for example, a program of executable computer instructions, may be executed by processor 1020 and able to generate signals to be communicated via a network, for example, as previously described. Generated signals may also be stored in memory, also previously suggested.

Memory 1022 may store electronic files and/or electronic documents, such as relating to one or more users, and may also comprise a computer-readable medium that may carry and/or make accessible content, including code and/or instructions, for example, executable by processor 1020 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 10, processor 1020 may comprise one or more circuits, such as digital circuits, to perform at least a portion of a computing procedure and/or process. By way of example, but not limitation, processor 1020 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1020 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 10 also illustrates device 1004 as including a component 1032 operable with input/output devices, for example, so that signals and/or states may be appropriately communicated between devices, such as device 1004 and an input device and/or device 1004 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
acquiring knowledge from one or more knowledge sources;
storing the acquired knowledge in a memory;
parsing a natural language query; and
in response to parsing the natural language query, accessing one or more electronic documents, the one or more electronic documents expressing a knowledge graph including a plurality of nodes expressed in the electronic document;
traversing the knowledge graph to detect an absence of detail sufficient to completely answer the parsed natural language query;
invoking an application program interface (API) to extract at least a portion of the stored acquired knowledge and create a managed semantic object to be included as a node in a modified knowledge graph in the one or more electronic documents, wherein:
the modified knowledge graph is capable of answering the natural language query based, at least in part, on the created managed semantic object, semantic labels generated with the created managed semantic object and an edge connecting the created managed semantic object to the modified knowledge graph;
the managed semantic object comprising:
a container, the container comprising:
one or more attributes relating the managed semantic object to a real-world object, the one or more attributes of the container to be determined based, at least in part, on the extracted at least a portion of the stored acquired knowledge, the one or more attributes of the container modelling behavior of the real-world object based, at least in part, on a statistical analysis of observations obtained from the extracted at least a portion of the stored acquired knowledge and enabling the managed semantic object to dynamically change relative to other elements in the modified knowledge graph based, at least in part, on the one or more attributes of the real-world object;
an indication of at least one of the one or more knowledge sources;
one or more linguistic rules associated with the real-world object;
at least one discovery objective to at least in part determine the acquired knowledge;
an indication of one or more sourcing methods associated with at least one of the one or more knowledge sources; and
evidence of an availability of content in the one or more knowledge sources according to a particular format.

2. The method of claim 1, wherein the one or more attributes of the container to be determined based, at least in part, on tribal knowledge obtained from the one or more knowledge sources.

3. The method of claim 2, and further comprising capturing the tribal knowledge as one or more annotations to a visual depiction of an item of knowledge.

4. The method of claim 3, wherein the annotations are received in a text format, audio format, emoji format, image format or video format, or a combination thereof.

5. The method of claim 2, wherein at least one of the one or more attributes of the container that relate the managed semantic object to the real-world object comprise one or more inferences based, at least in part, on one or more observed facts, the method further comprising determining the at least one of the one or more attributes of the container based, at least in part, on a computed degree of corroboration of the one or more observed facts with the tribal knowledge.

6. The method of claim 1, wherein at least one of the one or more knowledge sources comprises one or more sensors.

7. The method of claim 1, wherein the acquired knowledge is obtained based, at least in part, on at least one discovery objective.

8. The method of claim 1, and wherein:
the acquired knowledge is based, at least in part, on one or more items of evidence; and the container further comprises an indication of confidence in one or more inferences regarding the acquired knowledge, the indication of confidence being computed based, at least in part, on one or more semantic expressions observed in the one or more items of evidence.

9. The method of claim 8, and wherein the confidence in the one or more inferences regarding the acquired knowledge is further based, at least in part, on one or more observations of evidence expressed in the managed semantic object.

10. The method of claim 1, wherein creating the managed semantic object further comprises sampling the acquired knowledge according to a sampling methodology, and wherein the container further comprises an indication of the sampling methodology.

11. The method of claim 1, wherein creating the managed semantic object further comprises transforming the acquired knowledge to a particular format.

12. The method of claim 1, and wherein the container further comprises an indication of statistics regarding at least one aspect of the acquired knowledge.

13. The method of claim 1, and wherein the container further comprises an indication of natural language descriptors of the real-world object.

14. A method comprising:
acquiring knowledge from one or more knowledge sources;
storing the acquired knowledge in a memory;
parsing a natural language query;
in response to parsing the natural language query,
accessing one or more electronic documents, the one or more electronic documents expressing a knowledge graph including a plurality of nodes expressed in the one or more electronic documents;
traversing the knowledge graph to detect an absence in the knowledge graph of sufficient detail to completely answer the parsed natural language query; and
responsive to detecting the absence in the knowledge graph of sufficient detail to completely answer the parsed natural language query, creating a managed semantic object via an application program interface (API), the created managed semantic object to be included as a node in a modified knowledge graph expressed in the accessed one or more electronic documents, the managed semantic object comprising:
a container comprising one or more attributes relating the managed semantic object to a real-world object, the one or more attributes of the container to be determined based, at least in part, on the stored acquired knowledge, wherein:
the one or more attributes of the container relate the managed semantic object to one or more attributes of the real-world object, the one or more attributes of the container to model behavior of the real-world object based, at least in part, on a statistical analysis of observations obtained from the stored acquired knowledge and to enable the managed semantic object to dynamically change relative to other elements in the modified knowledge graph based, at least in part, on the one or more attributes of the real-world object;
the created managed semantic object enables the modified knowledge graph to at least partially answer the parsed natural language query; and
the parsed natural language query is answerable based, at least in part, on semantic labels associated with the created managed semantic object and an edge connecting the created managed semantic object to the modified knowledge graph.

15. The method of claim 14, wherein creating the managed semantic object further comprises:
determining a discovery objective based, at least in part, on the natural language query; and
obtaining the acquired knowledge based, at least in part, on the discovery objective.

16. The method of claim 14, and further comprising connecting the created managed semantic object to an existing managed semantic object in the modified knowledge graph by an edge, wherein semantic labels associated with the created managed semantic object, the existing managed semantic object and the edge define a relationship between the created managed semantic object and the existing managed semantic object.

17. An article comprising:
a non-transitory storage medium, the non-transitory storage medium comprising stored thereon, instructions executable by one or more processors of a computer device to:
acquire knowledge from one or more knowledge sources;
store the acquired knowledge in a memory;
parse a natural language query; and
in response to parsing the natural language query,
access one or more electronic documents, the one or more electronic documents expressing a knowledge graph including a plurality of nodes expressed in the electronic document;
traverse the knowledge graph to detect an absence of detail sufficient to completely answer the parsed natural language query;
invoke an application program interface (API) to extract at least a portion of the stored acquired knowledge and create a managed semantic object, wherein:
the created managed semantic object is included as a node in a modified knowledge graph expressed in the one or more electronic documents;
the modified knowledge graph is capable of answering the natural language query based, at least in part, on the created managed semantic object, semantic labels generated with the created managed semantic object and an edge connecting the created managed semantic object to the modified knowledge graph; and the managed semantic object comprises:
a container comprising one or more attributes relating the managed semantic object to a real-world object, the one or more attributes of the container to be based, at least in part, on acquired knowledge obtained from one or more knowledge sources, wherein:
the one or more attributes of the container relate the managed semantic object to one or more attributes of the real-world object, the one or more attributes of the container to model behavior of the real-world object based, at least in part, on a statistical analysis of observations obtained from the acquired knowledge and to enable the managed semantic object to dynamically change relative to other elements in the knowledge graph based, at least in part, on the one or more attributes of the real-world object; and
the container further comprises:
an indication of at least one of the one or more knowledge sources;
one or more linguistic rules associated with the real-world object;

at least one discovery objective to at least in part determine the acquired knowledge;
an indication of one or more sourcing methods associated with at least one of the one or more knowledge sources; and
evidence of an availability of content in the one or more knowledge sources according to a particular format.

18. An apparatus comprising:
one or more processors to:
acquire knowledge from one or more knowledge sources;
store the acquired knowledge in memory;
parse a natural language query; and
in response to the parsed natural language query,
access one or more electronic documents, the accessed one or more electronic documents expressing a knowledge graph including a plurality of nodes expressed in the one or more electronic documents;
traverse the knowledge graph to detect an absence in the knowledge graph of at least one node or managed semantic object sufficient to answer the natural language query;
invoke an application program interface (API) to extract at least a portion of the stored acquired knowledge and create a managed semantic object, wherein the created managed semantic object is included as a node in a modified knowledge graph expressed in the one or more electronic documents;
the managed semantic object enabling the modified knowledge graph to answer the parsed natural language query, the managed semantic object comprising:
a container comprising one or more attributes relating the managed semantic object to a rea-world object, the one or more attributes of the container to be determined based, at least in part, on the extracted at least a portion of knowledge, wherein:
the one or more attributes of the container relate the managed semantic object to one or more attributes of the real-world object, the one or more attributes of the container to model behavior of the real-world object based, at least in part, on a statistical analysis of observations obtained from the extracted at least portion of knowledge and enables the managed semantic object to dynamically change relative to other elements in the modified knowledge graph based, at least in part, on the one or more attributes of the real-world object; and
the parsed natural language query is answered based, at least in part, on the created managed semantic object, semantic labels generated with the managed semantic object and an edge connecting the created managed semantic object to the modified knowledge graph.

19. The apparatus of claim 18, wherein the one or more attributes of the container to be determined based, at least in part, on tribal knowledge obtained from the one or more knowledge sources.

20. The apparatus of claim 18, wherein the one or more processors are further to:
capture tribal knowledge as one or more annotations to a visual depiction of an item of knowledge, the visual depiction of the item of knowledge to be based, at least in part, on the knowledge graph; and
update the knowledge graph based, at least in part, on the one or more annotations to the visual depiction.

21. The apparatus of claim 20, and further comprising one or more input devices to receive at least some of the one or more annotations in a text format, audio format, emoji format, image format or video format, or a combination thereof.

* * * * *